(12) United States Patent
Robertson

(10) Patent No.: US 10,347,156 B2
(45) Date of Patent: Jul. 9, 2019

(54) INTEGRATED PELVIC AND PERINEAL REPAIR MODEL

(71) Applicant: Andrea Lea Robertson, Hamilton (CA)

(72) Inventor: Andrea Lea Robertson, Hamilton (CA)

(*) Notice: Subject to any disclaimer, the term of this patent is extended or adjusted under 35 U.S.C. 154(b) by 271 days.

(21) Appl. No.: 15/234,713

(22) Filed: Aug. 11, 2016

(65) Prior Publication Data

US 2017/0046984 A1 Feb. 16, 2017

Related U.S. Application Data

(60) Provisional application No. 62/203,813, filed on Aug. 11, 2015.

(51) Int. Cl.
*G09B 23/28* (2006.01)
*G09B 23/30* (2006.01)

(52) U.S. Cl.
CPC ......... *G09B 23/281* (2013.01); *G09B 23/30* (2013.01)

(58) Field of Classification Search
CPC ....... G09B 23/28; G09B 23/281; G09B 23/30
USPC .......................... 434/262, 267, 272, 273, 295
See application file for complete search history.

(56) References Cited

U.S. PATENT DOCUMENTS

| | | | | |
|---|---|---|---|---|
| 2,495,568 A * | 1/1950 | Coel | .......... | G09B 23/32 434/273 |
| 3,921,311 A * | 11/1975 | Beasley | .......... | G09B 23/281 434/273 |
| 4,195,420 A * | 4/1980 | Fields | .......... | G09B 23/30 434/273 |
| 5,104,328 A | 4/1992 | Lounsbury | | |
| 5,472,345 A * | 12/1995 | Eggert | .......... | G09B 23/281 434/273 |
| 7,553,159 B1 * | 6/2009 | Arnal | .......... | G09B 23/281 434/267 |

(Continued)

FOREIGN PATENT DOCUMENTS

| | | |
|---|---|---|
| CN | 201336100 Y | 10/2009 |
| CN | 101763764 A | 6/2010 |

(Continued)

OTHER PUBLICATIONS

Knitted Uterus, www.birthinternational.com/products/models/knitted-uterus printed Aug. 8, 2015.

(Continued)

*Primary Examiner* — Kurt Fernstrom
(74) *Attorney, Agent, or Firm* — Bereskin & Parr LLP/S.E.N.C.R.L., s.r.l.; Tony Orsi

(57) ABSTRACT

Various embodiments are described herein for an integrated female pelvic model that comprises a main body having a front opening with curved edges to define a pliable vulvar opening; and a first compartment having a front portion that is flexibly attached to the curved edges of the main body, an end portion that is disposed within the main body having a first side that is shaped to provide a cervix structure and a second side that is flexibly anchored to a first portion of the main body; and a first channel that extends within the first compartment from the front portion to the end portion of the first compartment, the first channel defining a continuous, flexible vagina ending at the cervix structure.

22 Claims, 17 Drawing Sheets

(56) References Cited

U.S. PATENT DOCUMENTS

| | | | |
|---|---|---|---|
| 7,866,983 B2 | | 1/2011 | Hemphill et al. |
| 8,517,740 B2 * | | 8/2013 | Trotta ................. G09B 23/281 434/267 |
| 9,373,270 B2 * | | 6/2016 | Miyazaki ............. G09B 23/281 |
| 9,830,834 B2 * | | 11/2017 | Miyazaki ............. H05K 999/99 |
| 9,972,219 B2 * | | 5/2018 | Garvik ................. G09B 23/281 |
| 2007/0172804 A1 * | | 7/2007 | Allen ................... G09B 23/281 434/273 |
| 2009/0298035 A1 * | | 12/2009 | Lynch ...................... A41D 1/21 434/273 |
| 2012/0015339 A1 * | | 1/2012 | Hendrickson ........ G09B 23/303 434/268 |
| 2013/0192741 A1 | | 8/2013 | Trotta et al. |
| 2014/0011172 A1 | | 1/2014 | Lowe |
| 2014/0087345 A1 | | 3/2014 | Breslin et al. |
| 2014/0087346 A1 | | 3/2014 | Breslin et al. |
| 2015/0132733 A1 | | 5/2015 | Garvik et al. |

FOREIGN PATENT DOCUMENTS

| | | |
|---|---|---|
| CN | 101441832 B | 11/2010 |
| CN | 201897902 U | 7/2011 |
| CN | 101996513 B | 5/2012 |
| CN | 202601055 U | 12/2012 |
| CN | 203354595 U | 12/2013 |
| CN | 203386405 U | 1/2014 |
| CN | 203397593 U | 1/2014 |
| CN | 203673739 U | 6/2014 |
| JP | 2012220871 A | 11/2012 |

OTHER PUBLICATIONS

Labor Birth Training Simulator Set of 5 Parts https://www.buyamag.com/gynecological_models.php Buyamag Inc., Carlsbad, CA 92011, USA, printed Aug. 8, 2015, pp. 1-14.

Perineal Repair Trainer, https://www.simulab.com/products/prt-20 printed Aug. 8, 2015, pp. 1-3.

Midwifery Toolbox, Woolgina Pelvic Floor Perineal Muscles Perineum Suturing, www.etsy.com/ca/listing/223994913/woolgina-pelvic-floor-perineal-muscles?ga_order=most_relevant&ga_search_type=all&ga_view_type=gallery&ga_search_query=woolgina&ref=sr_gallery_1, printed Apr. 29, 2015.

Keele & Staffs Perineal Repair Trainer, limbsandthings.com/us/products/keele-staffs-preineal-repair-trainer, printed Aug. 8, 2015.

Noelle® Moes™ Mobile Obstetrics Emergency Simulator, http://www.geneq.com/en/biotechnology/clinical-instruments-and-labware/noelle%C2%AE-moes%E2%84%A2-mobile-obstetric-emergency-simulator.html, printed Aug. 8, 2015.

AR312 Episiotomy Suturing/Perineal Repair Trainer, http://www.adam-rouilly.co.uk/productdetails.aspx?pid=3568&cid=, printed Aug. 8, 2015.

The Model-med Sophie and her Mum, www.modelmed.com.au/products, printed Aug. 8, 2015.

Episiotomy Trainers, http://www.enasco.com/c/healthcare/OB%26%2347%3BGYN/Episiotomy%20Trainers/, printed Apr. 29, 2015.

Episiotomy & Perineal Repair Block, limbsandthings.com/ca/products/episiotomy-perineal-repair-block, printed Apr. 29, 2015.

Obstetrics and Midwifery, limbsandthings.com/ca/products/category/obstetrics-midwifery, printed Apr. 29, 2015.

Performing an episiotomy, Perineal Repair Trainer, limbsandthings.com/ca/products/perineal-repair-trainer, printed Apr. 29, 2015.

Perineal Laceration Kit—Anatomical Model, http://www.nucleuscatalog.com/perineal-laceration-kit/view-item?ItemID=70736, printed Apr. 29, 2015.

Pugmire Perineal Laceration Repair Model, perinealrepair.weebly.com/order-premade-kits.html, printed Apr. 29, 2015.

Pugmire Perineal Laceration Repair Model Details, perinealrepair.weebly.com/model-details.html, printed Apr. 29, 2015.

Pugmire Perineal Laceration Repair Model, Perineal Laceration and Episiotomy Repair Model, perinealrepair.weebly.com/index.html, printed Apr. 29, 2015.

Pugmire Perineal Laceration Repair Model, Build Your Own Model, perinealrepair.weebly.com/build-your-own-kits.html, printed Apr. 29, 2015.

* cited by examiner

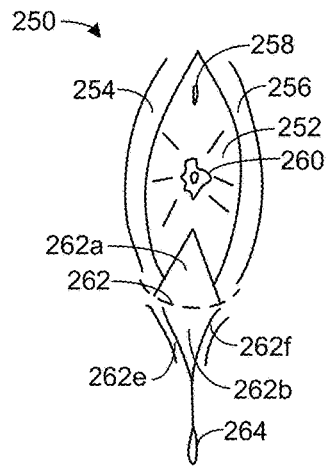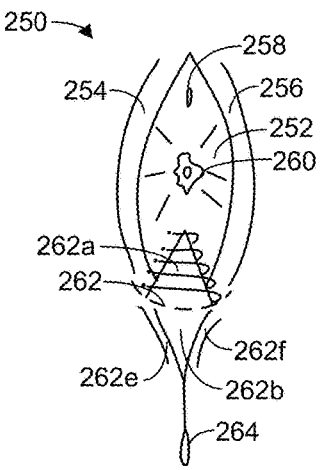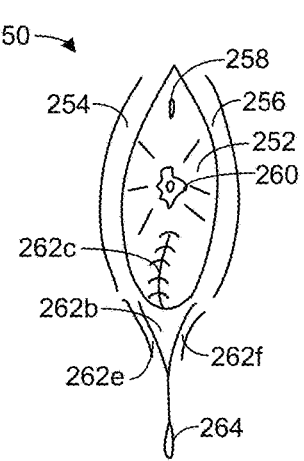
FIG. 4A   FIG. 4B   FIG. 4C
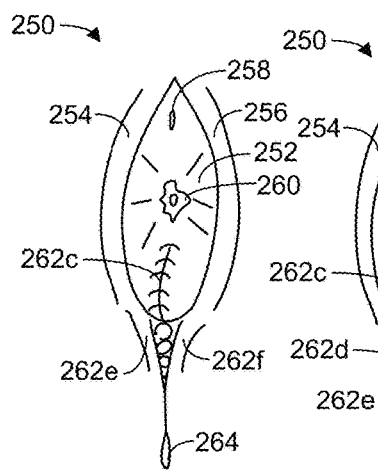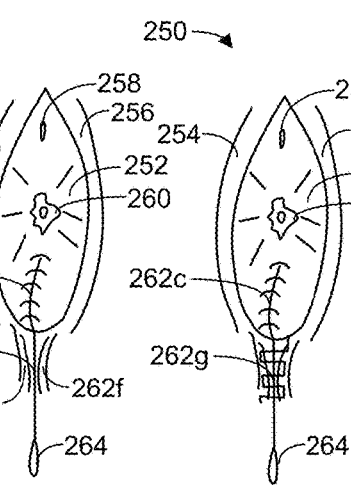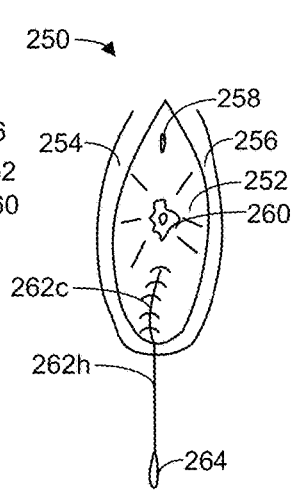
FIG. 4D   FIG. 4E   FIG. 4F   FIG. 4G

INTEGRATED PELVIC AND PERINEAL REPAIR MODEL

CROSS-REFERENCE

This application claims the benefit of U.S. Provisional Patent Application No. 62/203,813 filed Aug. 11, 2015; the entire contents of Patent Application No. 62/203,813 are hereby incorporated by reference.

FIELD

Various embodiments are described herein that generally relate to an integrated female pelvic model which may be used for educational and training purposes including, but not limited to, practicing repairs of various types of vaginal and perineal tears.

BACKGROUND

A female pelvic model is a model showing at least some of the female genital organs and may also include nearby structures such as the urethra and rectum. Conventional female pelvic models may show at least one of external, internal and cross-sectional portions of the female genital organs and nearby structures. Conventional female pelvic models may be used for educational and/or training purposes for a variety of examinations and procedures. For example, some conventional female pelvic models may be used to teach and practice the repair of tears which may occur during birth. However, some conventional pelvic models are not that effective in training and practice due to their construction.

SUMMARY OF VARIOUS EMBODIMENTS

In a broad aspect, at least one embodiment described herein provides an integrated female pelvic model comprising a main body having a front opening with curved edges to define a pliable vulvar opening; and a first compartment having: a front portion that is flexibly attached to the curved edges of the main body; an end portion that is disposed within the main body having a first side that is shaped to provide a cervix structure and a second side that is flexibly anchored to a first portion of the main body; and a first channel that extends within the first compartment from the front portion to the end portion of the first compartment, the first channel defining a continuous, flexible vagina ending at the cervix structure.

In at least some embodiments, the cervix structure may comprise a cervix opening and a rear enclosure forming a closed pocket that is flexibly anchored to the main body, the cervix opening being sized to allow a finger or cervical catheter to pass therethrough and to allow for some inflation of a catheter inflation lumen.

In at least some embodiments, the model comprises a second channel having a first open end disposed above the first channel, the second channel extending into the main body, being flexible and being shaped to provide a pliable urethra.

In these embodiments, the second channel has a length that is about a third to a half of a length of the first channel and has a second opening at a distal end that is sized to allow a urinary catheter to visibly and palpably pass therethrough, and to allow for lumen inflation of the catheter.

In at least some embodiments, the second channel may be part of the first compartment but is spaced apart from the first channel.

In at least some embodiments, the main body may comprise a second compartment that is flexibly attached to a portion of the curved edges of the main body and may be partially open to the first channel, the second compartment being shaped to simulate a flexible laceration.

In at least some embodiments, the second compartment may be flexibly anchored to a second portion of the main body to provide correct positioning based on a severity and angle of laceration.

In at least some embodiments, the main body comprises a third channel with an opening disposed beneath the first compartment, the third channel extending into the main body, being flexible and being shaped to provide a pliable rectum and being flexibly anchored to a third portion of the main body to provide correct positioning of the rectum.

In at least some embodiments, the first compartment, the first channel and the second channel may be formed using two sheets of fabric that are attached together and the second compartment and the third channel are formed using another two sheets of fabric that are attached together.

In at least some embodiments, the main body of the model may be flexible.

In at least some embodiments, an exterior of the model may be made of fabric comprising cotton weave or other materials that maintain integrity of shape.

In at least some embodiments, the first compartment may be made of ribbed cotton providing vertical and horizontal stretching but not stretching along a longitudinal axis thereof.

In at least some embodiments, the model may be stuffed with flexible filler material comprising polyester.

In at least some embodiments, the model may comprise a re-openable closure to allow for inserting or replacing flexible filler material inside the female pelvic model.

In at least some embodiments, the main body comprises a base having a non-slip outer surface.

In at least some embodiments, the main body may comprise a base and a front surface that is inclined relative to the base at an angle less than 90 degrees to simulate an actual female pelvic position encountered during various procedures comprising at least one of examination or repair of lacerations incurred during childbirth, speculum examination and PAP (Papanicolaou) sample collection, for example.

In at least some embodiments, the main body may comprise a front section having a front wall with the front opening; a mid-section flexibly attached to the front section, the mid-section having arched sidewalls, a rear section flexibly attached to the mid-section; and a base section flexibly attached to the front section, the mid-section and the rear section.

In at least some embodiments, the rear section may provide anchor points for several flexible elements of the female pelvic model.

In another aspect, in at least one embodiment described herein this is provided an integrated female pelvic model comprising: a main body that is flexible; a vaginal structure having a first open end that is disposed at a front surface of the main body and a second end that is disposed within the main body; and a cervical structure having a first end that is disposed at the second end of the vaginal structure and a second end that is flexibly coupled to a first rear portion of the main body, wherein the main body and the structures are made of fabric.

In at least some embodiments, the female pelvic model further comprises a compartment disposed below the vaginal structure, the compartment having a first end disposed on the front surface of the main body, a second end that is flexibly anchored to a second rear portion of the main body and is shaped to form a flexible laceration.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 4A-4G shows an example of repair practice that may be performed with a female pelvic model having a second degree laceration.

Figure 1B:
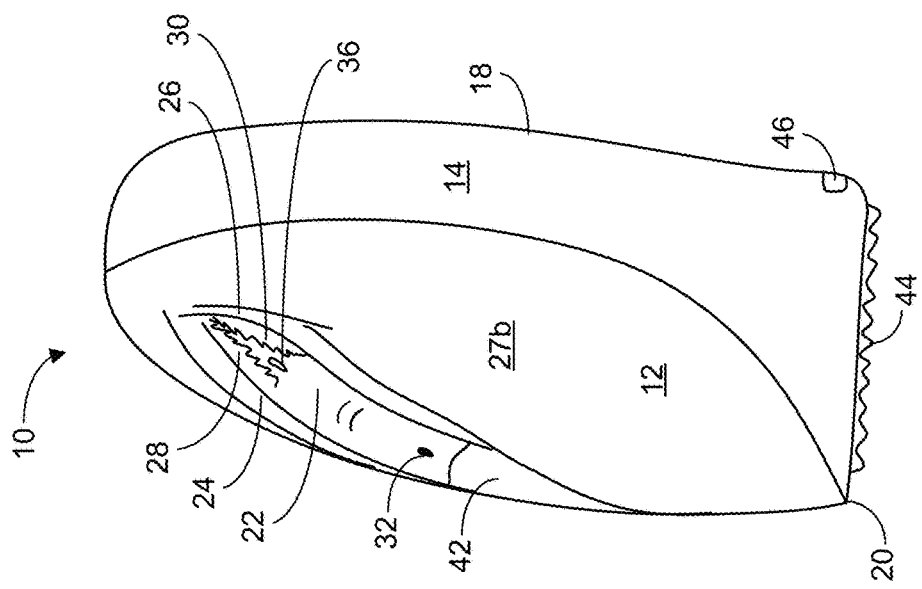
FIG. 1B shows a side perspective view of the female pelvic model of FIG. 1A.

Further aspects and features of the example embodiments described herein will appear from the following description taken together with the accompanying drawings.

DETAILED DESCRIPTION OF THE EMBODIMENTS

Various apparatuses or methods will be described below to provide an example of at least one embodiment of the claimed subject matter. No embodiment described herein limits any claimed subject matter and any claimed subject matter may cover apparatuses or methods that differ from those described herein. The claimed subject matter is not limited to apparatuses or methods having all of the features of any one process or apparatus described below or to features common to multiple or all of the apparatuses or methods described herein. It is possible that an apparatus or method described herein is not an embodiment of any claimed subject matter. Any subject matter that is disclosed in an apparatus or method described herein that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical connotation. For example, as used herein, the terms coupled or coupling can indicate that two or more elements can be directly connected to one another or can be connected to one another through one or more intermediate mechanical elements depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term that it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 10%, for example.

In accordance with the teachings herein, at least one embodiment is provided for an integrated pelvic and perineal repair model that is three dimensional and portable and may be used for teaching and learning (e.g. simulating and practicing) about the female pelvis region and various procedures that may be performed to the female pelvis region such as, but not limited to, perineal repair for childbirth related injuries, and various examinations and procedures including, but not limited to, speculum examination, urinary and cervical catheterization, vaginal repair, perineal repair, speculum examination, digital exploration of the vagina and cervix, administration of medication by needle injection, specimen sampling from the vagina and cervix, bimanual examination, episiotomy, and instrumental vaginal delivery, for example. Therefore, the models described in accordance with the teachings herein may be used for demonstration as well as for allowing repeated practice for the development of various skills needed for certain procedures that are performed on the female pelvis region. For example, at least one of the various female pelvic models described in accordance with the teachings herein may be suitable for clinicians who wish to use the model to explain to patients/clients a repair that has been completed, and how to care for the vagina/perineum during healing.

In another aspect, at least one of the embodiments described in accordance with the teachings herein generally include more extensive structural features that are also functional and not just representational. Examples of such features include at least one or more of a palpable cervix, a stretchable vagina, a pliable rectal canal, a pliable urethral canal, pliable labia majora, pliable labia minora, and simulated laceration regions which are also pliable.

In another aspect, at least one of the embodiments described herein provide an integrated pelvic and perineal repair model that is generally made of a material that allows at least one of the structural features of the female pelvic area to be pliable such as, but not limited to, a stretchable vagina, a pliable urethra, a pliable cervix and a pliable rectum, for example.

In another aspect, at least one of the embodiments described in accordance with the teachings herein provides a three dimensional, portable and standalone model for teaching and practicing how to perform repairs for different types of lacerations that may occur during childbirth. Accordingly, at least one of the pelvic models described herein may allow for simulation of various stages of perineal repair including at least one of: initial visualization, tissue approximation for suturing (e.g. at least one of vaginal, perineal, and subcuticular suturing or stitching), and inspection of repair for completeness and accuracy (which may include rectal exam for misplaced sutures)).

In another aspect, at least one of the pelvic models described in accordance with the teachings herein may be used in a variety of settings including, but not limited to, at least one of university midwifery, obstetrical, family medicine, and nursing programs, preceptor-student clinical settings, skills review and maintenance workshops for practitioners.

Referring now to FIGS. 1A-1D, shown therein is a front perspective view, a side perspective view, a bottom view and a cross-sectional view, respectively, of an example embodiment of a female pelvic model 10. The female pelvic model 10 comprises a main body having a front section 12, a right sidewall 14 and a left sidewall 16 defining a mid-section, a rear section defined by a rear wall 18 and a base 20. The main body may be made of at least one type of fabric or another flexible material. Accordingly, the mid-section is flexibly attached to the front section, the rear section is flexibly attached to the mid-section and the base 20 is flexibly attached to the front, mid and rear sections.

The main body of the female pelvic model 10 includes a front surface having a front opening defined by curved edges 24 and 26 that form the labia majora and provide a pliable vulvar opening. The portions of the main body on either side of the front opening may be sewn along a substantial portion thereof to create ridges that extend from a substantially top portion of the front opening to a lower portion of the front opening to form the labia majora 24 and 26. Accordingly, the labia majora 24 and 26 are flexible and may be moved when pulled or pushed.

The front surface of the main body may also include rounded or bulbous regions 27a and 27b that represent portions of the groin area to provide for a more realistic tactile experience when someone uses the female pelvic model 10 for training or educational purposes. The regions 27a and 27b may be provided with more or less filling material to provide different sizes or shapes for the groin area.

The main body also comprises a first compartment 22 having a front portion 22o that is flexibly attached to the curved edges 24 and 26 of the front opening of the main body, an end portion 22e that is disposed within the main body and a first channel 22c that extends within the first compartment 22 from the front portion 22o to the end portion 22e. The end portion 22e has a first side that is shaped to provide a cervix structure 37. The first channel 22c is flexible and may be made of a stretchy fabric to provide a pliable, stretchy continuous vagina that ends at the cervix structure 3T A second side of the end portion 22e may also be flexibly anchored to a first portion 37a of the main body. The first compartment 22 may be made from a different material than the main body to provide a different visual marker to differentiate it from other components of the female pelvic model 10, to provide a different tactile sensation and to provide different tensile characteristics, such as being more stretchable than the surface of the main body.

Figure 1A:
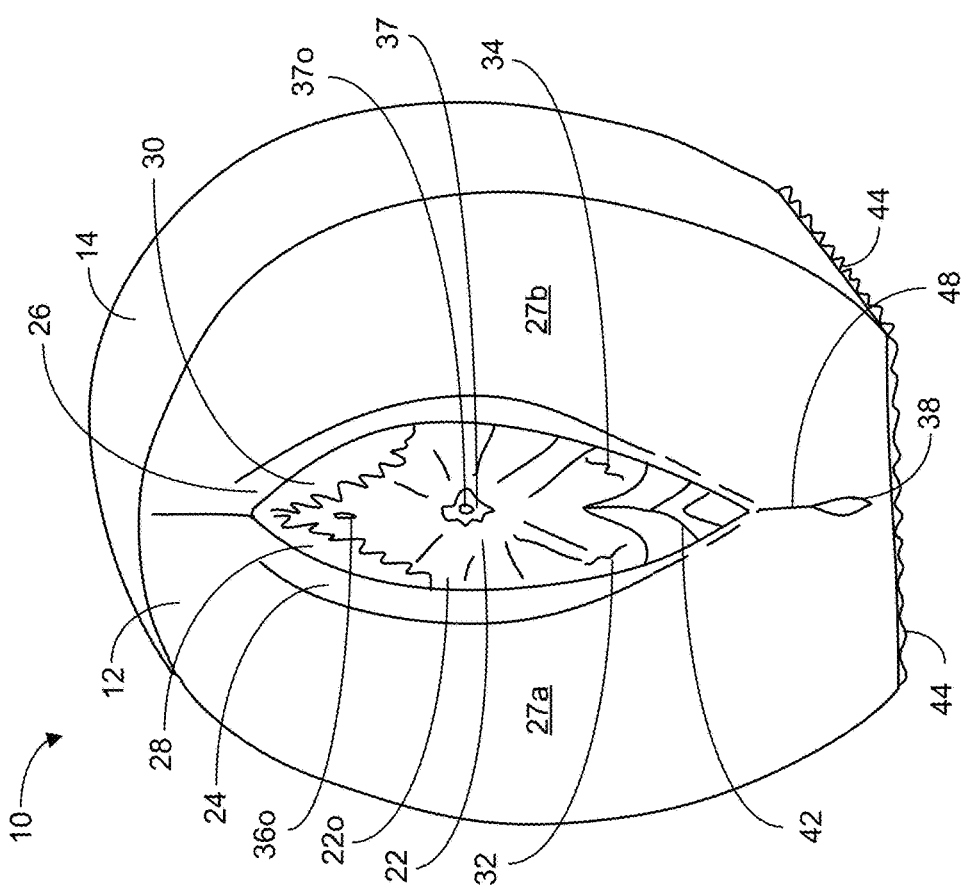
FIG. 1A shows a front perspective view of an example embodiment of a female pelvic model.
Figure 1C:
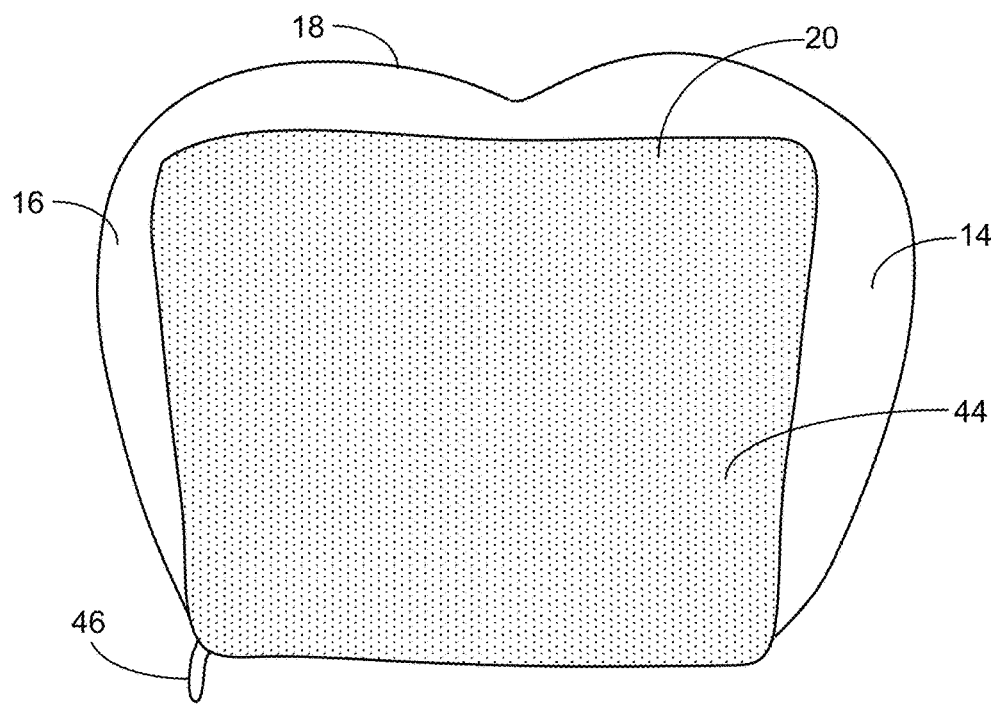
FIG. 1C shows a bottom view of the female pelvic model of FIG. 1A.
Figure 1D:
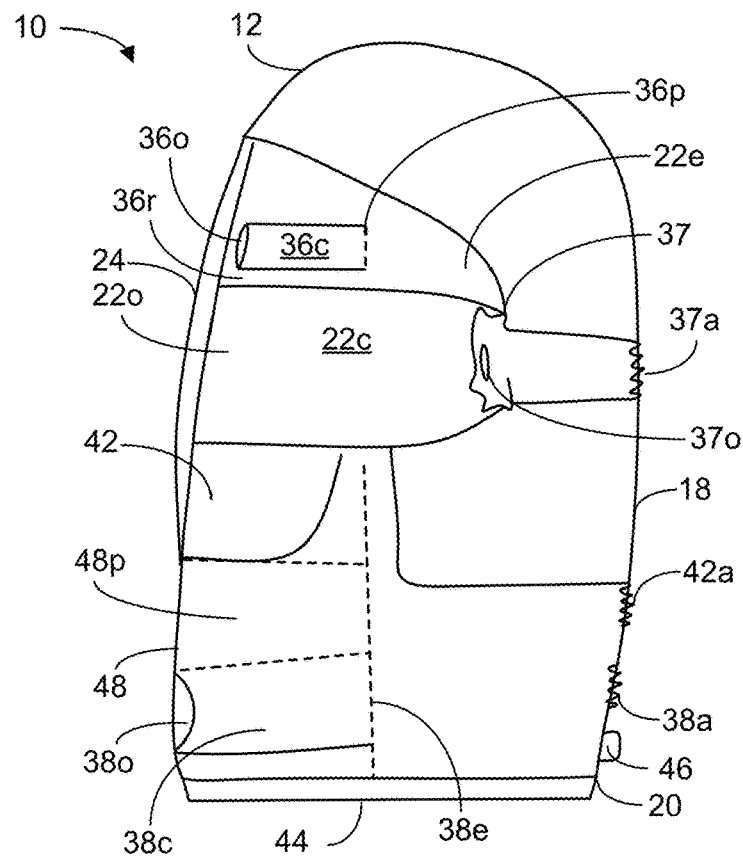
FIG. 1D shows a cross section view of the female pelvic model of FIG. 1A.

The cervix structure 37 has a cervical opening 37o and a rear enclosure forming a closed pocket that may be flexibly anchored to a portion of the main body. The cervix structure 37 may have a toroidal shape, for example. The cervix opening 37o may be sized to allow a finger or cervical catheter to pass therethrough to provide for teaching or training of cervical digital examinations or catheterization of the cervix. The cervix opening 37o is smaller than a first end of the vaginal opening at a front surface of the main body as shown in FIG. 1D. In some embodiments, the compartment behind the cervix can also be sized to allow for some inflation of a catheter inflation lumen.

The female pelvic model 10 may also comprise left and right labia minora 28 and 30 that are flexibly attached between the curved edges 24 and 26 forming the labia majora and the front portion 22o of the first compartment 22. In at least some embodiments, the labia minora 28 and 30 may have a 3 dimensional shape and be made from the same material as the external body or may be made from a different flexible material than the first compartment 22 and the main body of the female pelvic model 10. For example, the labia minora 28 and 30 may be made from lace to provide a different visual marker to differentiate these elements from other components of the female pelvic model 10. The labia minora 28 and 30 may also be flexible so that they may move when pushed or pulled. In alternative embodiments, fabric folds or attachments may be used instead of lace to form the labia minor 28 and 30.

Figures 2A, 2B:
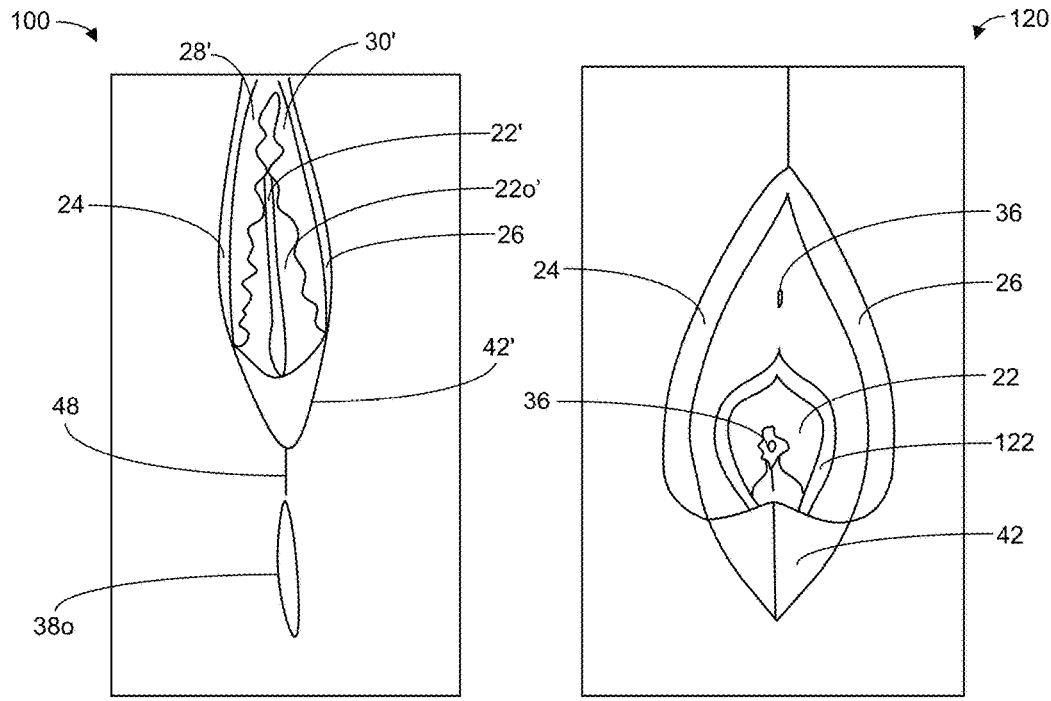
FIG. 2A shows a front view of a portion of another example embodiment of a female pelvic model.
FIG. 2B shows a front view of a portion of another example embodiment of a female pelvic model.

The female pelvic model 10 may further comprise hymen remnants 32 and 34 that may be formed along an inner surface of the front portion 22o of the first compartment 22 by attaching (e.g. by sewing) adjacent segments of the front portion 22o together to create folds. In alternative embodiments, additional pieces may be attached to inner surfaces of the frontal portion 22o of the first compartment 22 to form these hymen remnants 32 and 34. In alternative embodiments, a full hymen remnant (as shown in FIG. 2B) may be attached to the inner surface of the front portion 22o of the first compartment 22. In other embodiments, a full hymen structure may be removably attached to the inner surface of the front portion 22o of the first compartment 22. Alternatively, in other embodiments, there may be no hymen elements at all.

The female pelvic model 10 may further comprise a urethra 36 that is formed by a second channel 36c having a first open end 36o disposed above the first channel 22c. The second channel 36c extends into the main body, is flexible and is generally shaped and made of flexible material to provide a pliable urethra. Accordingly, the first open end 36o of the channel 36c simulates the urethral opening. A second end 36p of the second channel 36c may also be an open end and may open into a rear portion of the first compartment 22. This geometric configuration allows for the demonstration and/or practice of inserting a urinary catheter since the second end 36p of the second channel 36 opens into a mid or rear portion of the of the model 10 to receive an end of the urinary catheter. This allows for the end of the urinary catheter to be inflated and the inflated tip may be felt to provide for a more realistic experience of actually inserting and securing in place the urinary catheter as is done in actual practice. The second channel 36c may have about a third to a half of the length of the first channel 22c. Accordingly, the second channel 36c can be sized to allow a urinary catheter to visibly and palpably pass therethrough, and allow for lumen inflation of the urinary catheter. In embodiments where stitching is used to form the second channel 36c, depending on the material that is used for the second channel 36c, reinforced stitching may be used to allow intermittent or indwelling catheterization to be practiced. This reinforced stitching may also be used for the cervix structure 37 and a similar action for cervical catheterization may also be practiced.

In the example embodiment shown in FIGS. 1A-1D, the second channel 36c is part of the first compartment 22 but is spaced apart from the first channel 22c such that the two channels 36c and 22c may be separated by a region 36r. In alternative embodiments, the second channel 36c may have an opening 36o that is on the front portion of the main body and is separated from the first compartment 22.

The female pelvic model 10 may further comprise a second compartment 42 that may be flexibly attached to a portion of the curved edges 24 and 26 of the main body and is partially, as well as temporarily open, to the first channel 22c. The second compartment 42 may be shaped to form a flexible laceration that may be experienced during childbirth or may be due to an episiotomy. The second compartment 42 is flexibly anchored to a second portion 42a of the main body to provide correct positioning based on a severity and angle of the laceration. In FIGS. 1A-1D, the second compartment 34 is shaped to form a second degree mid-line laceration but other shapes may be used to simulate lacerations of other degrees and locations as will be discussed in relation to FIGS. 3A-3E.

The female pelvic model 10 may further comprise a third channel 38c with an opening 38o disposed beneath the first compartment 42. The third channel 38c extends into the main body, is flexible and is shaped and made of flexible material to provide a pliable rectum 38. An end portion 38e of the third channel 38c may be flexibly anchored to a third portion 38a of the main body to provide correct positioning of the rectum 38 and movement of the third channel 38c with respect to the main body of the female pelvic model 10.

The region between the rectum 38 and the vulvar opening 22o of the vaginal channel 22 is the perineum 40. When there is a perineal laceration 42, as is shown in FIG. 1A, then the surface of the perineum 40 extends from the bottom of the laceration 42 to the top of the rectum 38. It should be noted that the female pelvic model comprises a perineal pocket region 48p (see FIG. 1D) which may comprise filler material to create a separation between the rectum 38 and the vaginal channel 22c. This allows for an individual to perform a digital rectal exam using the female pelvic model 10 to determine if there is a laceration that has extended through to the rectum 38. The individual may also perform the digital rectal exam after performing a repair of a laceration in the perineal area and the rectal area to make sure that the individual has not made any errors such as stitching a portion of the rectal wall to a portion of the vaginal wall.

It should be noted that the anchor points 38a and 42a for the rectum and the laceration do not have to be at the same location since the anchoring is done to ensure that both the rectum 38 and the laceration 42, respectively, are at the correct position and orientation with respect to other landmarks on the female pelvic model 10 such as the vulvar opening 22o and are also pliable.

The front section of the main body of the female pelvic model 10 comprises a front surface with the vulvar opening 22o. The mid-section comprises two side walls 14 and 16 that may be arched and the rear section comprises a rear wall 18 that may be used to provide anchor points for various flexible elements of the female pelvic model 10.

The front surfaces of the main body of the female pelvic model 10 may be inclined or oriented at an angle less than 90 degrees with respect to the base 20. This allows for the female pelvic model 10 to be at a position and orientation that is more likely to be encountered in practice, such as during examination of the female pelvic region or repair of lacerations incurred during childbirth, for example. In alternative embodiments, the front surface of the main body may be oriented at 90 degree relative to the base 20.

It should be noted that in at least some embodiments, the base 20 may be made from a stable, non-slip material 44 (e.g. a grip material) that may be textured and provides a non-slip surface so the female pelvic model 10 does not slip even when placed on a smooth or otherwise slippery surface. For example, the textured surface may be a plurality of bumps or protrusions. As another example, the non-slip material 44 may be made from rubber. This non-slip surface and the soft, pliable surface of the main body allows the female pelvic model 10 to remain in a stable position to enhance skills development so that a person that is practicing or handling the female pelvic model 10 may use one of their hands to perform an action (such as digital inspection or suturing) and another hand to hold a portion of the main body which occurs very often when working with an actual female pelvis. For example, during a tear repair, the repairer's non-dominant hand may retract the sides of the laceration while their dominant hand places sutures (see FIG. 2C, for example). Also, in at least some embodiments, the base 20 may include a thick sheet or plate so that the base 20 does not lose its shape and remains stable while procedures are performed on the model 10.

The surface of the main body of the female pelvic model 10 may be flexible since it may be made using a fabric material (e.g. natural, synthetic or blended fabrics) or other flexible material and the main body may be filled with filler material. For example, the walls of the main body may be made of fabric comprising cotton such as, but not limited to, a 100% flat, light, tight, cotton weave. Alternatively, other fabrics may be used that hold their form (i.e. maintain integrity of shape), tolerate repeated needle punctures well, maintain their integrity such that needle punctures and removal of suture thread do not do not cause punctures that cause runs or loose threads as a result of punctures.

The first compartment 22 may be made of a material that provides vertical and horizontal stretching and minimal to no stretching along the longitudinal axis of the channel 22c. For example, the portions of the first compartment 22 that form the vagina 22c, the cervix 37 and the urethra 36, may be made of 100% ribbed cotton, which when sewn into the female pelvic model 10 and provides for stretching side to side as well as up and down, but not front to back. Another fabric material that provides a similar function, and tolerates repeated needle punctures well may be used.

The material used for the laceration provided by the second compartment 42 may be made from a different material than that used for the first compartment 22. For example, the material used for the second compartment 42 may be a thin but durable synthetic, meshed material that facilitates easy passage of a needle when someone is practicing stitching or suturing of a laceration.

In at least some embodiments, the laceration may be demarcated by using a material that has a different color compared to the color of the material used for the first compartment 22.

In at least some embodiments, the material used for the second compartment 42 may be re-usable in that it (and the filler material) allow for sutures to be placed over the laceration and then removed so that the female pelvic model 10 facilitates extensive reuse so that it may be repeatedly used to allow for practice of suturing skills.

The female pelvic model 10 may be filled with flexible filler material comprising polyester or other suitable pliable material that may be used as a filler material. For example, the filler material may be 100% polyester or blended fibers used for soft and lightweight stuffing of 3-dimensional objects. The filler material may also generally be lightweight, non-absorbent, and non-allergenic. The filler material may be flexible such that it conforms to the contour of female pelvic model, and is pliable therein.

In at least one embodiment, the female pelvic model 10 may further comprise a re-openable closure to allow for inserting or replacing the flexible filler material. The re-openable closure may be located at various portions of the main body, such as at the base 40 near the rear wall 18. In alternative embodiments, the re-openable closure may be disposed vertically along a portion of the rear wall 18 such as along the vertical center of the rear wall 18 or along one of the vertical edges of the rear wall 18. The re-openable closure may be a zipper, Velcro™, buttons or other suitable releasable fasteners. In alternative embodiments, the closure is not re-openable and may be stitched, glued, or otherwise adhered entirely closed.

The female pelvic model 10 may be made so that it is customized as some of the female pelvic models 10 may have different structural elements and different shapes. For example, FIG. 2A shows a front view of a portion of another example embodiment of a female pelvic model 100 in which the labia minora 28' and 30' cover a larger portion of the vulvar opening 22o'. In addition, the vulvar opening 22o' is smaller and the vaginal channel 26' is tighter. In addition, the rectum 38' is larger than the rectum 38 of the female pelvic model 10 (see FIG. 1A). As another example, FIG. 2B shows a front view of a portion of another female pelvic model 120 in which there are no labia minora but there is a hymen ring 122.

Figure 2C:
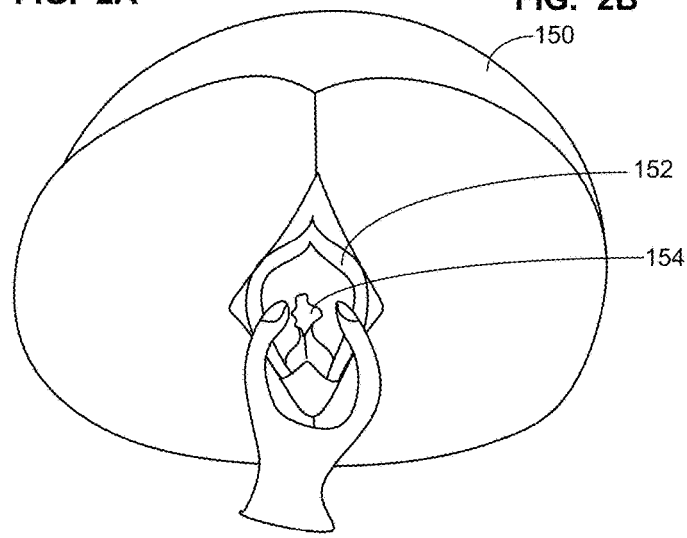
FIG. 2C shows a front view of another example embodiment of a female pelvic model showing pliability of the vulva for inspection of the vagina.
Figure 2D:
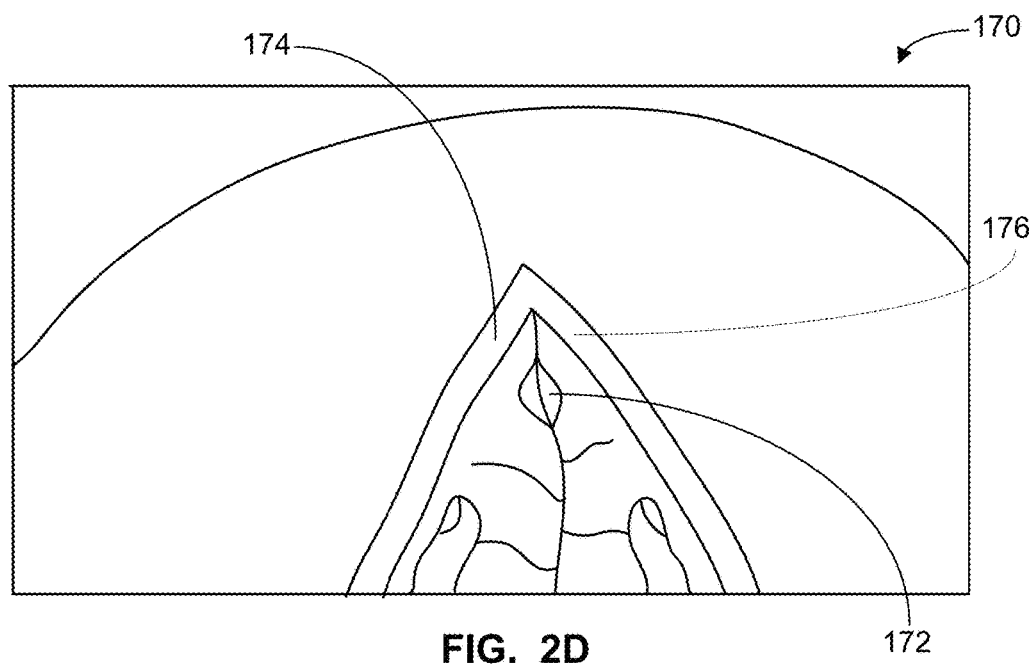
FIG. 2D shows a front view of another example embodiment of a female pelvic model showing pliability of the vulva for inspection of the urethra.
Figure 2E:
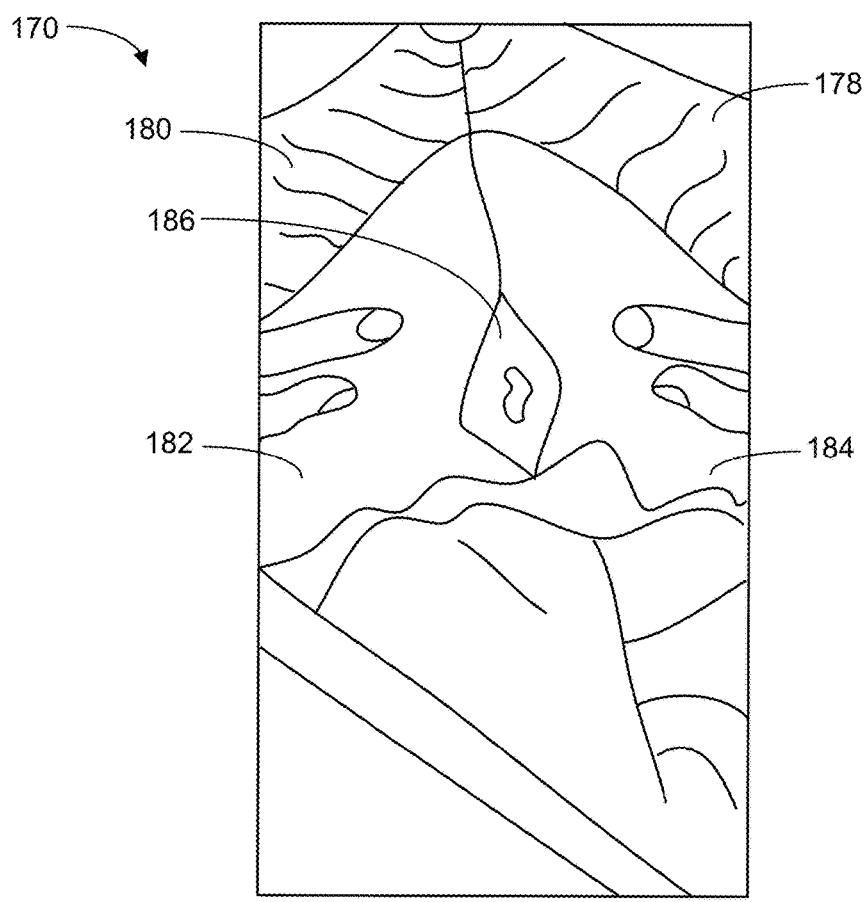
FIG. 2E shows a front view of the female pelvic model of FIG. 2D showing pliability of the vagina for inspection of the cervix.

Generally, the various female pelvic models described in accordance with the teachings herein allow for an individual to move various structural elements to perform various actions such as at least one of visual inspection, digital inspection and repair of simulated lacerations. For example, FIG. 2C shows a front view of a female pelvic model 150 with a person inserting their index and middle fingers into the vulvar opening 152 to push apart the walls of the vaginal canal thereby allowing for inspection of a portion of the vagina 154 for various issues such as the existence of tears (i.e. lacerations) simulating those that may occur during childbirth. Another example is shown in FIG. 2D which shows a front view of another female pelvic model 170 with a person using their index and middle fingers to push apart the labia minora 172 and 174 for inspection of the urethra 176. Another example is shown in FIG. 2E which shows a front view of the female pelvic model 170 with a person using their index and forefingers from both hands to move the labia majora 178 and 180 apart as well as a portion of opposing vaginal walls 182 and 184 for inspection of the cervix 186 for various issues such as the existence of tears simulating those that may occur during childbirth.

It should be noted that there may be various embodiments of the female pelvic model that are made in accordance with the teachings herein that do not include all of the structures found at the female pelvis thereby allowing these models to be used for different purposes. For example, there may be embodiments of female pelvic models that include the vagina, the cervix and at least one of the labia minora and labia majora. Alternatively, there may be embodiments of female pelvic models that in addition to the vagina, the cervix and at least one of the labia minora and labia majora also include at least one of the urethra, the rectum and a laceration. Generally female pelvic models with include a laceration also include the rectum for reasons discussed in relation to FIGS. 4A-4G. Furthermore, female pelvic models that include at least one laceration may have lacerations that are oriented differently or have different levels of severity as will be discussed with respect to FIGS. 3A-3E.

As previously mentioned, a mother may receive a laceration or tear during childbirth, which may occur naturally or may be due to an episiotomy. The lacerations are classified in terms of their level or degree of severity such as first degree, second degree, third degree and fourth degree lacerations. The lacerations are also classified in terms of their location such as medial (i.e. midline) or to the left or right of midline (i.e. medio-lateral).

For example, a first degree laceration may involve the skin around the vulvar opening 22o and usually include the perineum 48. First degree lacerations are the least severe. First degree lacerations may heal without stitches. The laceration 42 of the female pelvic model 10 shown in FIGS. 1A and 1B may be decreased in size so that not as much of the perineum 48 is torn to simulate a first degree laceration.

Figure 3A:
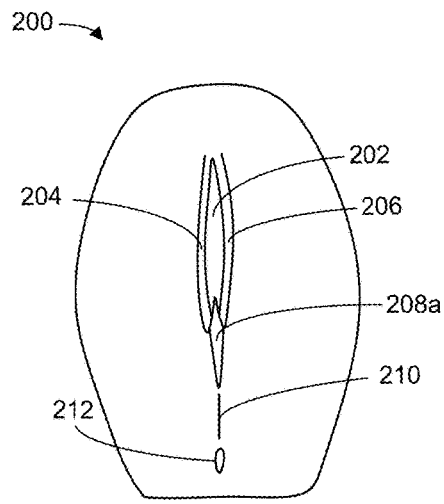
FIG. 3A shows a front view of an example embodiment of a female pelvic model with a midline second degree laceration.

Referring now to FIG. 3A, shown therein is a front view of an example embodiment of a female pelvic model 200 having a vagina 202, labia 204 and 206 defining a vulvar opening, a midline second degree laceration 208, a partially torn perineal body 210 and a rectum 212. It should be noted that the female pelvic models shown in FIGS. 3A-3E are simplified versions of the female pelvic model 10 and may include other structural features (as described for the female pelvic model 10) which are not shown in these figures for ease of illustration. The second degree vaginal tear 108c may affect the perineal muscles between the rectum 212 and the vagina 202 and may extend anywhere between the bottom of the vagina 202 to the top of the anal sphincter of the rectum 212 (although in the example of FIG. 3A, the tear extends about halfway between the bottom of the vagina 202 and the top of the rectum 212). Second degree vaginal tears are very common and suturing is used for hemostasis and tissue approximation.

Figure 3B:
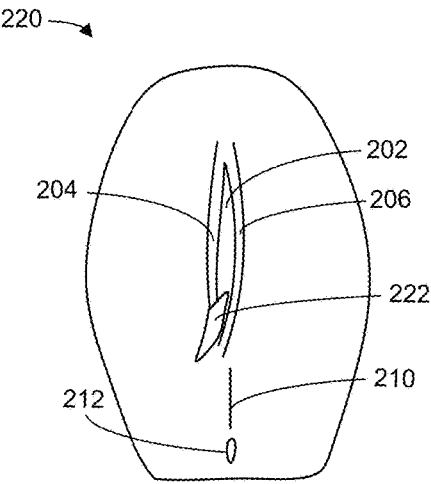
FIG. 3B shows a front view of an example embodiment of a female pelvic model with a medio-lateral second degree laceration.

Referring now to FIG. 3B, shown therein is a front view of an example embodiment of a female pelvic model 220 with a medio-lateral second degree laceration 222 that is to the left of the midline. The female pelvic model 220 is similar to the pelvic model 200 in that the lacerated region is about the same area except that the position of the laceration is shifted to the left of the midline.

Figures 3C, 3D:
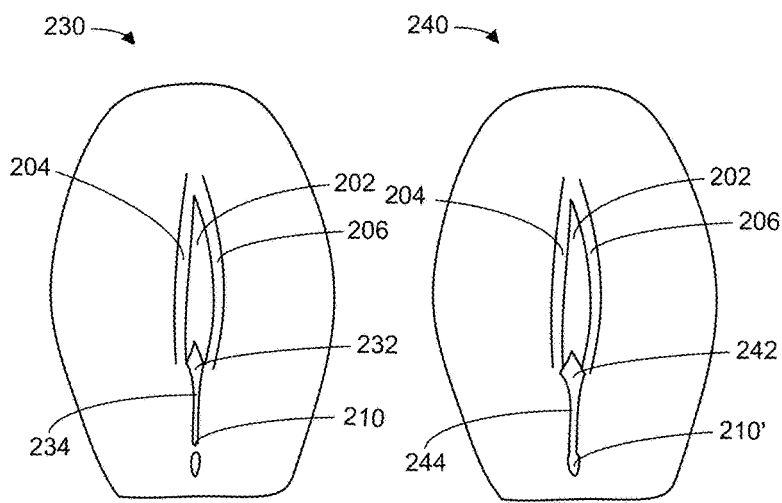
FIG. 3C shows a front view of an example embodiment of a female pelvic model with a third degree laceration.
FIG. 3D shows a front view of an example embodiment of a female pelvic model with a fourth degree laceration.

Referring now to FIG. 3C, shown therein is a front view of an example embodiment of a female pelvic model 230 with a third degree laceration 232. The laceration 232 extends to the rectum 210 and may affect the perineal muscles and the anal sphincter, which are the muscles that surround the rectum 210. Third degree vaginal tears must be repaired in order to prevent bowel incontinence and the repair is less complicated if performed just after the baby is delivered. Since the sphincter muscle fibers may retract into the surrounding tissue, a third degree vaginal tear may look like a second degree vaginal tear. To identify the severity of the tear, a rectal digital exam may be performed where a finger is inserted into the anus to see if the anal sphincter is still intact or has been torn (in the case of a third degree tear). To repair these tears, the torn ends of the sphincter muscles are brought out from the surrounding tissue and stitched together which may involve using special clamps to find and hold the torn ends of the sphincter muscles. The female pelvic model 230 may use different fabric or different fabric colors for the region 234 where there is a torn rectal mucosa area. If there are also torn rectal muscle fibers, then these may be indicated by using colored stitching. In an alternative embodiment, a transparent or mesh material may be used in which case the rectal canal 212 may be visible through the laceration material.

Figure 3E:
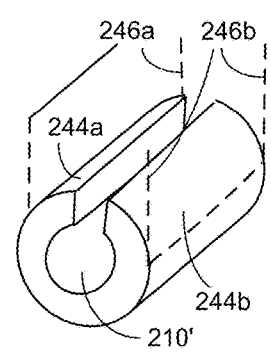
FIG. 3E shows a magnified front view of the fourth degree laceration of FIG. 3D in the vicinity of the rectum.

Referring now to FIG. 3D, shown therein is a front view of an example embodiment of a female pelvic model 240 with a fourth degree laceration 242. Fourth degree lacerations are most severe as they typically involve the vagina, perineal muscles, the anal sphincter and rectal tissue such that the vagina 202 and rectum 210' may form one continuous space. A magnified view of the rectum 210' is shown in FIG. 3E. The female pelvic model 240 shows folded seams 244a and 244b where the rectum has been torn as well as tear side walls 246a and 246b that extend from the vagina 202 to the rectum 210' and attach to the rectum 210' on the sides of the rectum 210' that are just on the outer left and outer right of the seams 244a and 244b, respectively. To repair a fourth degree vaginal tear, the rectum 210' may first be repaired, which may be done using the model 240 by sewing together the folded seams 244a and 244b. Thereafter the rest of the tear may be repaired as if it was a third degree tear.

Figure 3F:
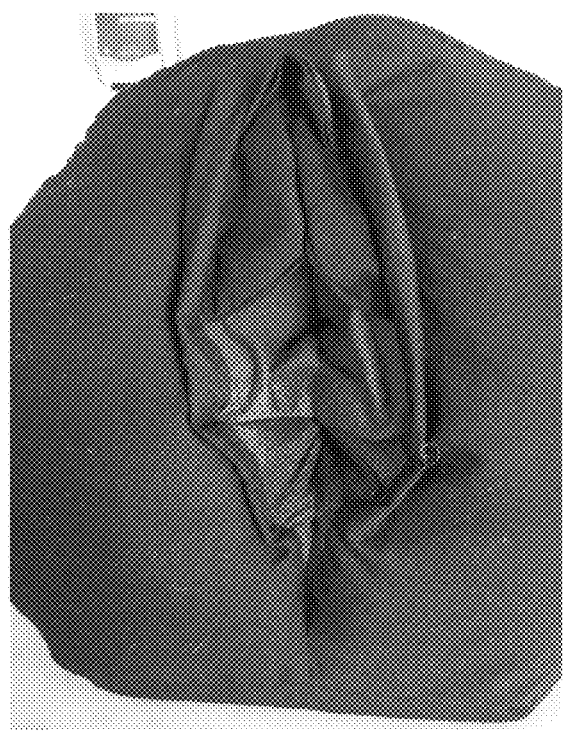
FIG. 3F shows a front view of another example embodiment of a female pelvic model with a third degree laceration.
Figure 3G:
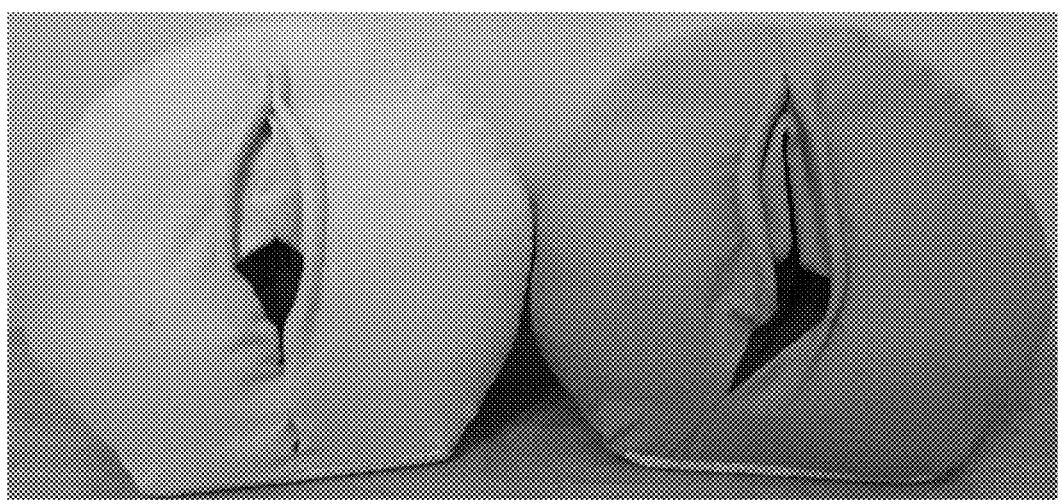
FIG. 3G shows a front view of example embodiments of female pelvic models having a medial-lateral laceration (on the left) and a medio-lateral laceration (on the right).

Other examples of lacerations are shown in FIGS. 3F-3G. In particular, FIG. 3F shows a front view of another example embodiment of a female pelvic model with a third degree laceration while FIG. 3G shows a front view of example embodiments of female pelvic models having a medial lateral laceration (on the left) and a medio-lateral laceration (on the right).

In another aspect, there can be embodiments of female pelvic models in which the size and location of the laceration may be different to practice skills for different types of lacerations.

Referring now to FIGS. 4A-4G, shown therein is an example of different steps of a repair procedure that may be performed with a female pelvic model 250 having a vagina 252, labia 254 and 256 defining a vulvar opening, a urethra 258, a cervix 260, a midline second degree laceration 262 and a rectum 264. The laceration 262 includes an upper lacerated vaginal portion 262a and a lower lacerated perineal portion 262b. It should be noted that the female pelvic model 250 shown in FIGS. 4A-4G is a simplified version of the female pelvic model 10 and may include other structural features (as described for the female pelvic model 10) which are not shown in these figures for ease of illustration.

An individual who is training on the female pelvic model 250 or is demonstrating how to conduct a laceration repair, begins by sewing together the upper lacerated vaginal portion 262a as shown in FIG. 4B to form a first seam line 262c as shown in FIG. 4C. It should be noted that now the first compartment and second compartments of the female pelvic model are closed off from one another as the vaginal floor has been repaired. The individual then goes on to sew together the lower lacerated perineal portion 262b as shown in FIG. 4D to form an intermediate seam 262d as shown in FIG. 4E. At this point it should be noted that since the seams 262e and 262f (see FIG. 4A) for the perineal laceration 262b are spaced apart from the front surface of the female pelvic model 250, a skin layer is created at the introitus (e.g. at the outer edges of the two seams 262e and 262f) which allows the individual to demonstrate or practice subcutaneous suturing of the perineum without contacting the seams 262e and 262f when creating the intermediate seam line 262d of the perineum layer. At this point the individual can then connect the skin layers near the seams 262e and 262f by using a suture 262g thereby forming a second seam line 262g (see FIG. 2G). The laceration 262 has now been repaired.

Figure 5A:
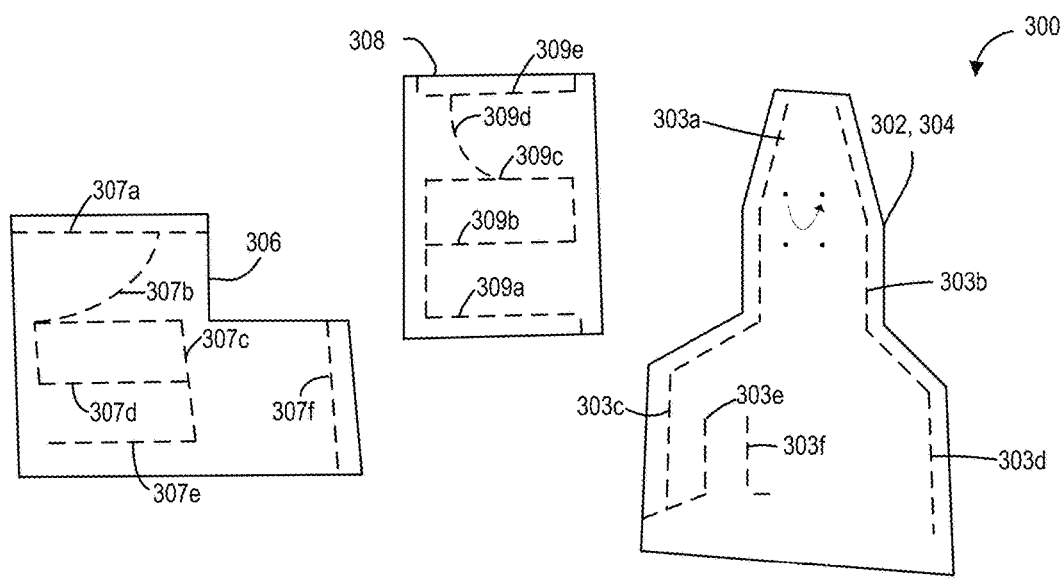
FIG. 5A-5C shows an example embodiment of templates that may be used to construct a fabric female pelvic model.
Figure 5B:
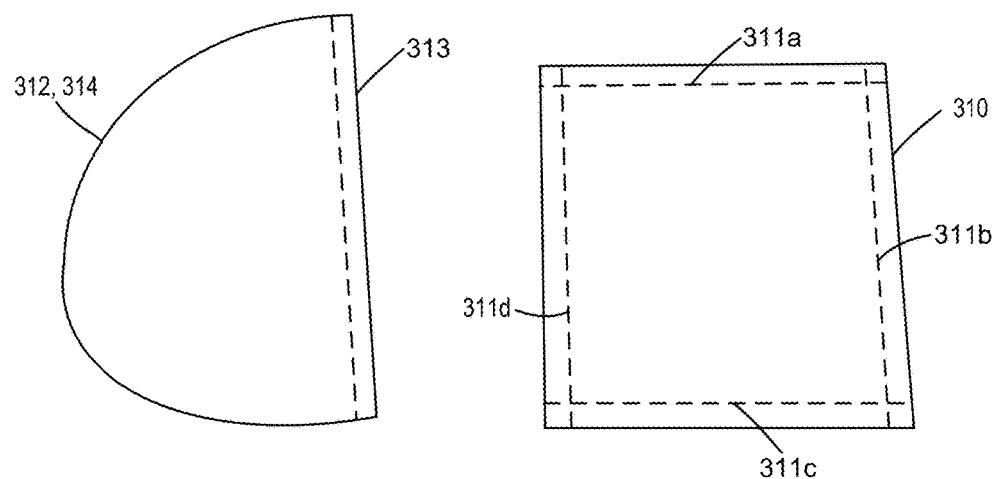
Figure 5C:
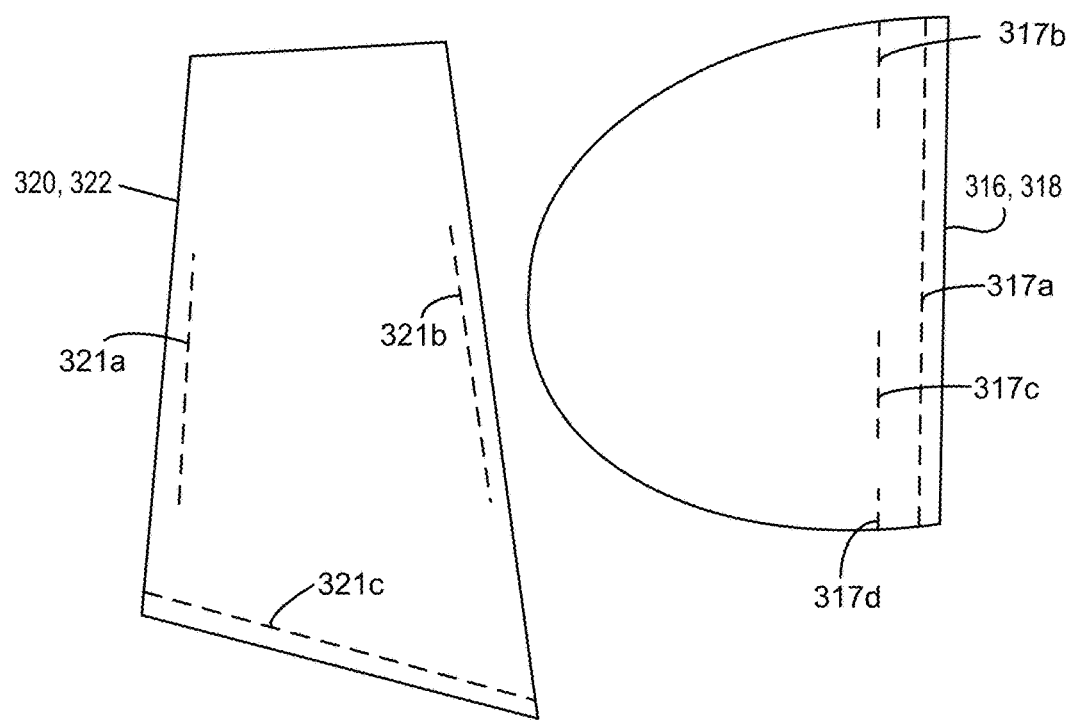

Referring now to FIGS. 5A-5C, shown therein is an example embodiment of a set of templates 300 that may be used to construct a fabric female pelvic model as described in accordance with the teachings herein. The set of templates 300 comprise templates 302 to 322. Fabric sheets are first cut to the patterns shown in each of the templates.

The templates 302 and 304 may be used for forming the first compartment of the female pelvic model include the vaginal, urethral and cervical structures. In particular seam lines 303a and 303b may be used to fold the cervix structure by placing fabric sheets cut to templates 302 and 304 beside each other to line up seam lines 303a and 303b from each fabric sheet, then folding back the portion of the sheets within the four square dots and then attaching the sheets along the seam lines 303a and 303b to form the cervix. The sheets are also attached at seam lines 303e and 303f to form the urethral canal and attached at seam lines 303d to form the vaginal channel. The sheets are also attached at seam line 303c to complete the first compartment.

The templates 306 and 308 may be used to form the rectal and perineal sections as well as the second compartment comprising the laceration. In particular, a sheet cut to template 308 is flipped horizontally and aligned with a sheet cut to template 306 so that the seam lines 309d and 307b align and are attached to form the laceration and the second compartment, the seam lines 309b and 307d align and are attached to form the top of the rectal channel and the seam lines 307e and 309a align and are attached to form the bottom of the rectal channel. The seam lines 307b and 309d may be varied in position and length to form lacerations having different depths and orientations. The box to the right of seam line 307c is attached to the box between seam lines 309b and 309c to form the perineal compartment and before these box regions are completely attached they are filled with filler material. The top seams 307a and 309e are attached to the seam lines 303d of the first compartment structure to join together all of the internal structures.

For the sub-structure corresponding to templates 302, 304, 306 and 308, the seam line 307f is used to anchor the rectal structure and the laceration structure to a portion of the main body of the female pelvic model, while the portion of the sheets (corresponding to the templates 302 and 304) to the left of seam lines 303a and 303b is used to anchor the cervix (and thereby the vaginal channel) to another portion of the main body. In this example, the seam line 313 of the rear wall may be used to provide separate anchor points for the rectal, laceration, cervix and vaginal structures to the main body.

The template 310 may be used to form the base for the main body. A sheet that is cut corresponding to the template 310 comprises seam lines 311a, 311b, 311c and 311d. The seam lines 311a and 311c may be attached to sheets forming the side walls of the main body. The seam line 311b may be attached to sheets that form the front surface of the main body. The seam line 311d may be attached to a fastener that releasably closes and opens so that filler material may be placed within the main body and replaced after a certain period of use.

The templates 312 and 314 may be used to form the rear portion of the main body. Sheets that are cut to template 312 and 314 may be oriented end to end and attached to one another at seam 313, which also forms an anchoring portion for the main body to which the other vaginal, cervical, rectal and laceration structures may be anchored.

The templates 316 and 318 are used to cut front sheets that are used for the front surface of the main body and are attached on either sides of the sub-structure forming the urethral, vaginal, cervix, rectal, perineal and laceration structures. In particular, the side sheets each have a seam 317a the majority of which is used to form one labia each for the female pelvic model as well as the skin structure at the introitus region (at the lower portion of the seam 317a). Each side sheet at the seam 317b is used to attach to one another and at the top portion of the sub-structure to form a hood region. The side sheets at the seam 317c are then attached to one another as well as the perineal body of the sub-structure (e.g. the left side of the box to the left of seam line 307c for template 306). The bottom portions of the seam lines 317d and the bottom portion of the side sheets are then attached to the seam line 311b of the base sheet cut according to template 310.

The templates 320 and 322 are used to cut side sheets that are used for the side sections of the main body. The side sheets have a front seam 321b that may be attached to the left arched portions of the front sheets cut according to templates 316 and 318. The side sheets also have a bottom seam 321c that may be attached to one of the seam lines 311a and 311c to attach the side sheets to the base of the model. The side sheets also have a rear seam line 321a for attaching to the left arched portion of the back sheets cut from the templates 312 and 314 to attach the side sheets to the rear of the model. The side sheets may also be attached to one another at top portions thereof to complete the main body for the model.

Figure 6A:
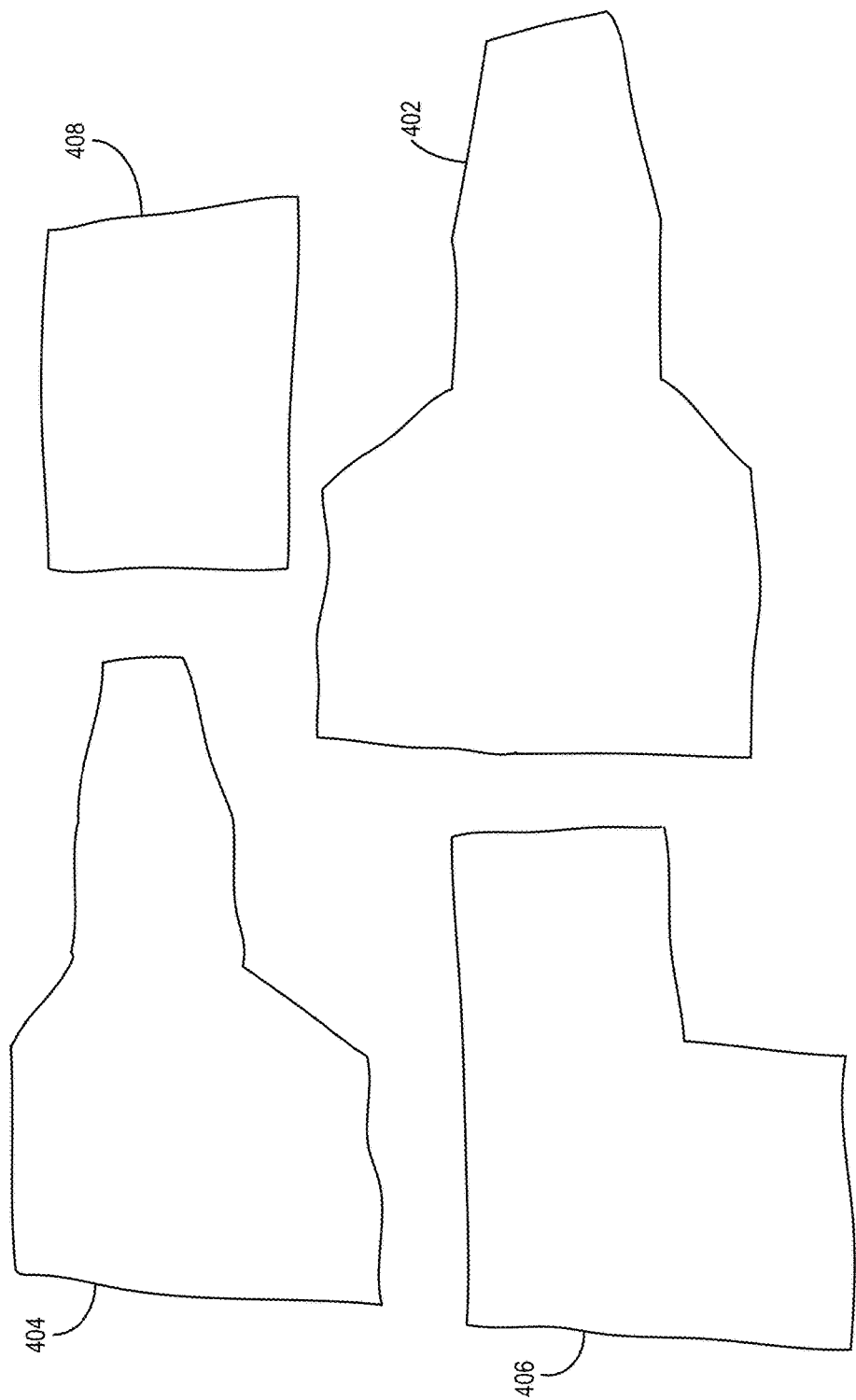
FIG. 6A illustrates four internal pieces that may be used to form the vaginal, perineal and rectal sub-structures.
Figure 6B:
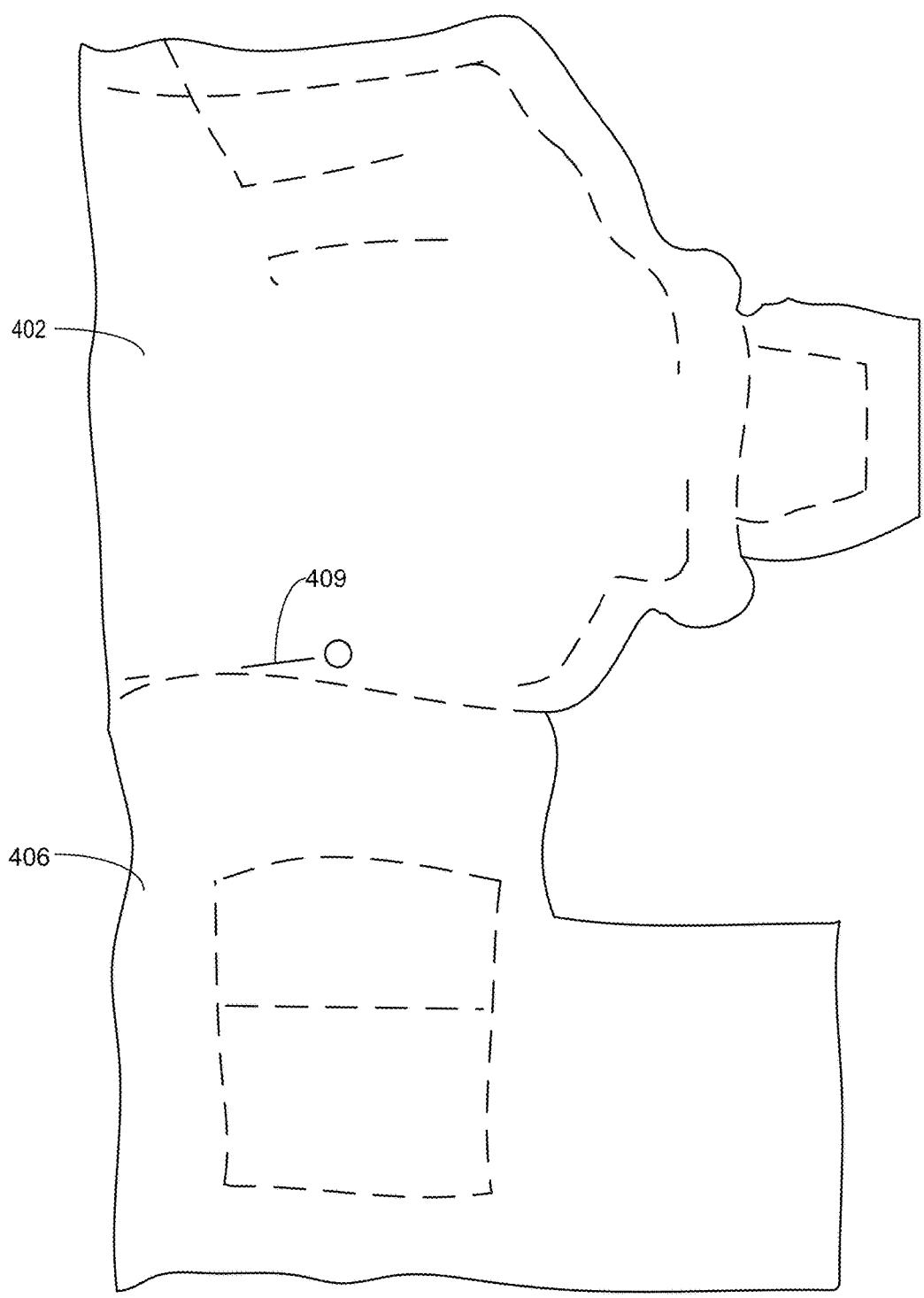
FIG. 6B illustrates internal stitching for the urethra, cervix, the laceration, rectum and the in-between pocket for the perineal body.
Figure 6C:
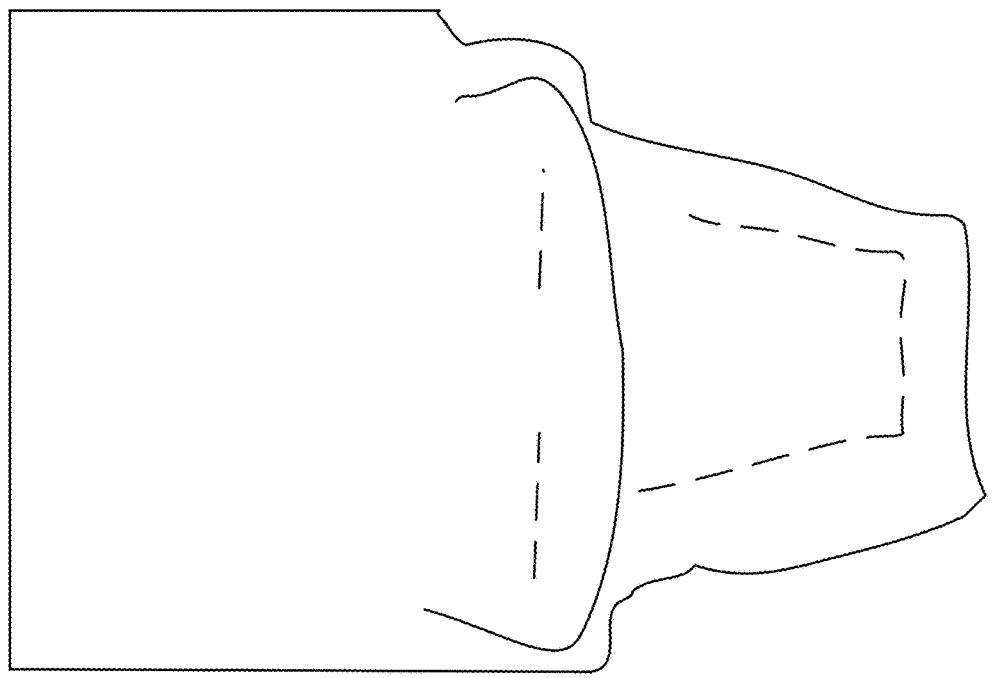
FIG. 6C illustrates cervix formation by folding and sewing.
Figure 6D:
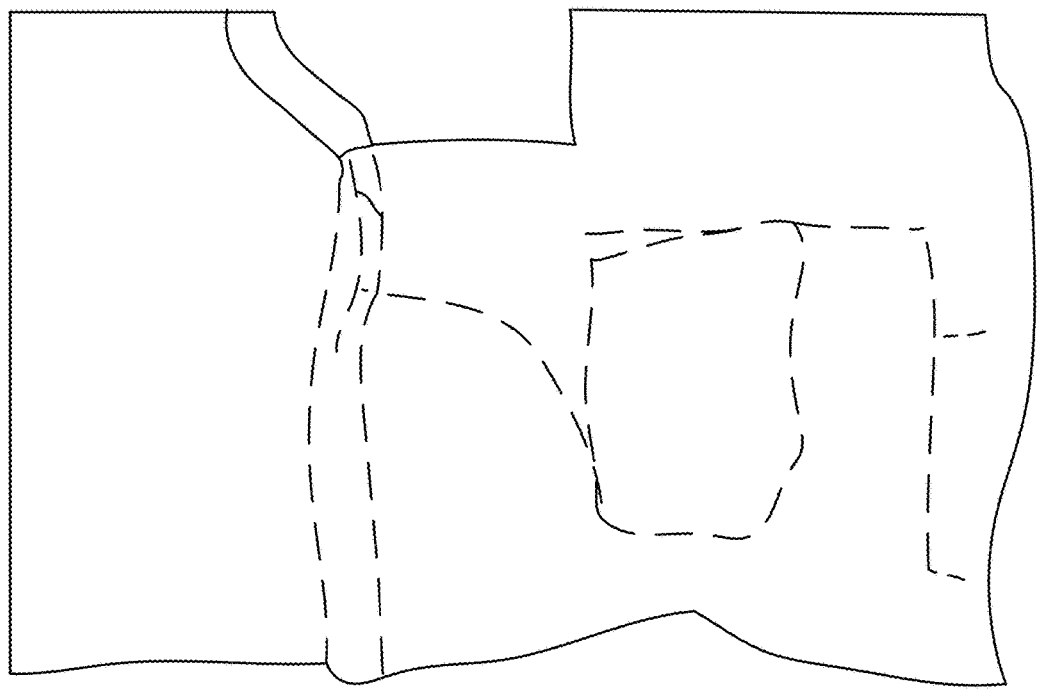
FIG. 6D illustrates the closed pocket formation for the region between the rectum and the vagina.
Figure 6E:
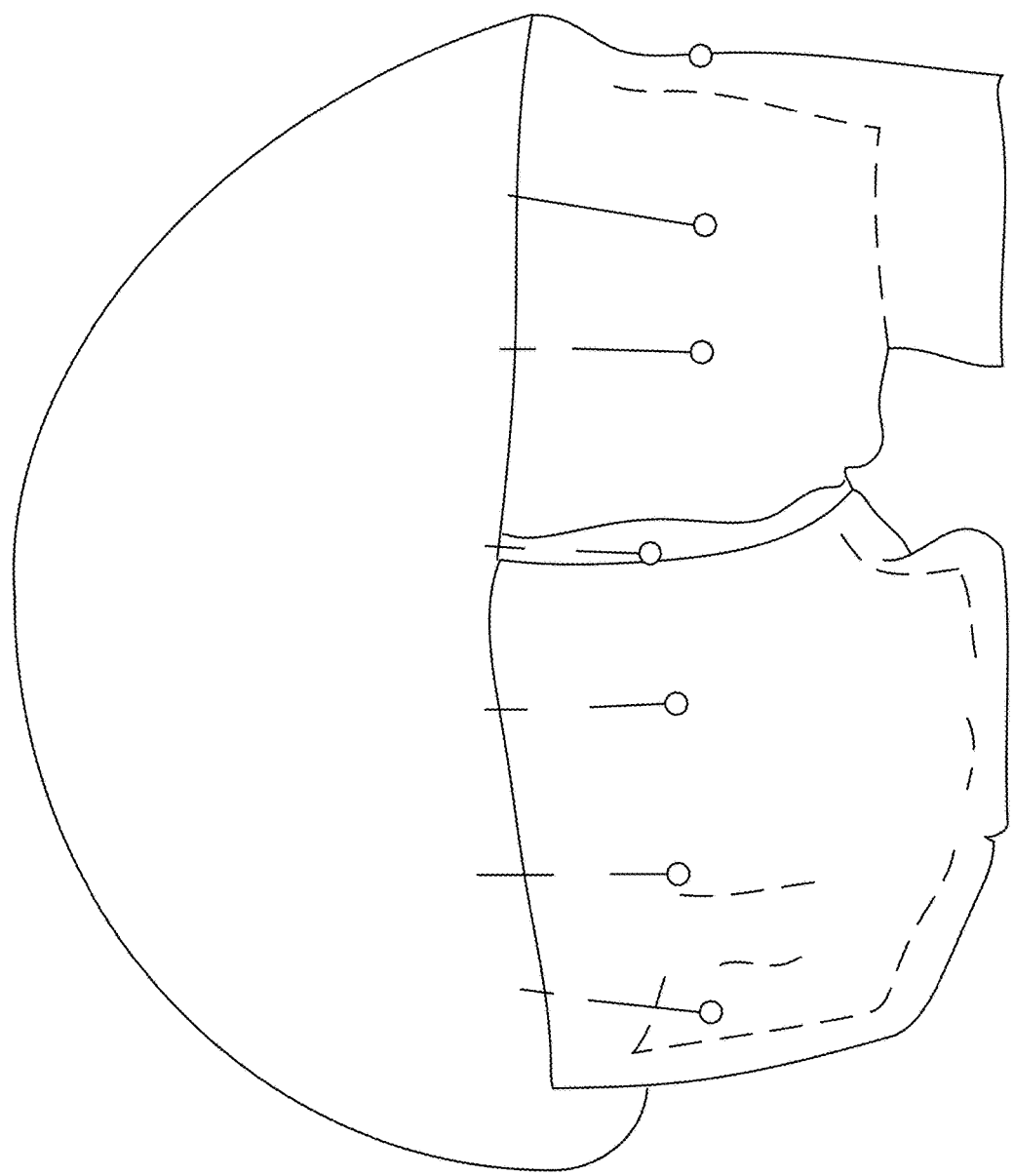
FIG. 6E illustrates a first side of the internal substructures being joined to the main body of the female pelvic model.
Figure 6F:
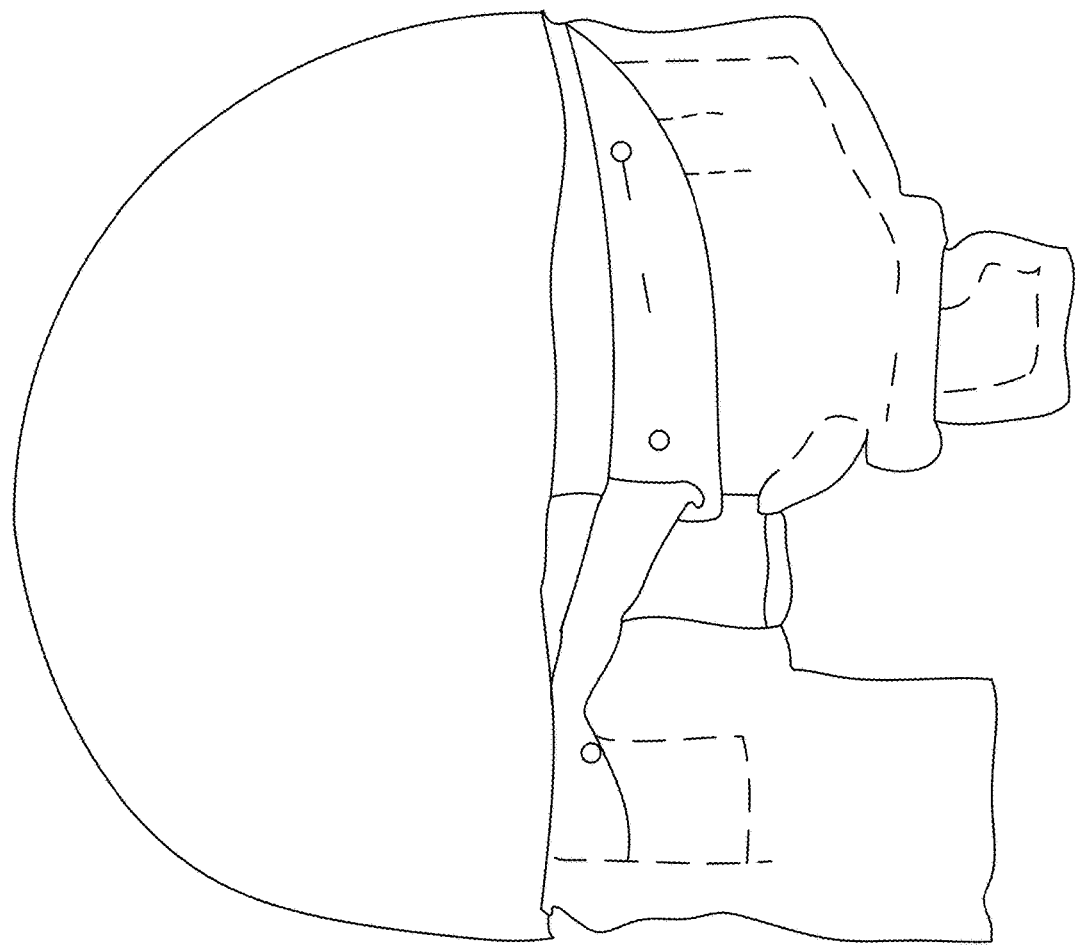
FIG. 6F illustrates a second side of the internal substructures being joined to the main body of the female pelvic model.
Figure 6G:
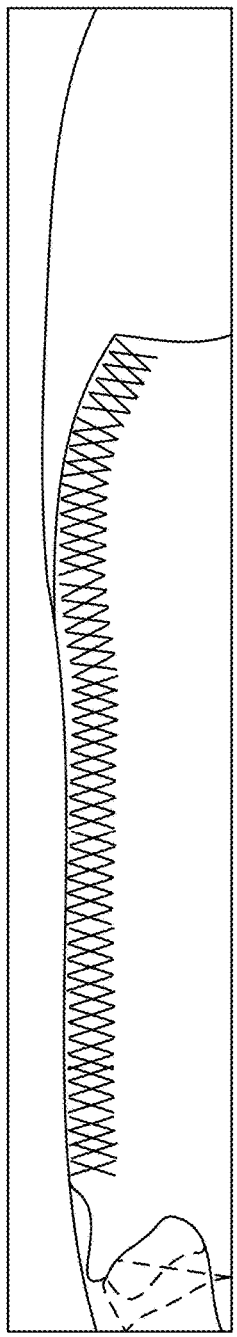
FIG. 6G illustrates anchoring of the upper and lower portions of the internal substructures to the main body.
Figure 6H:
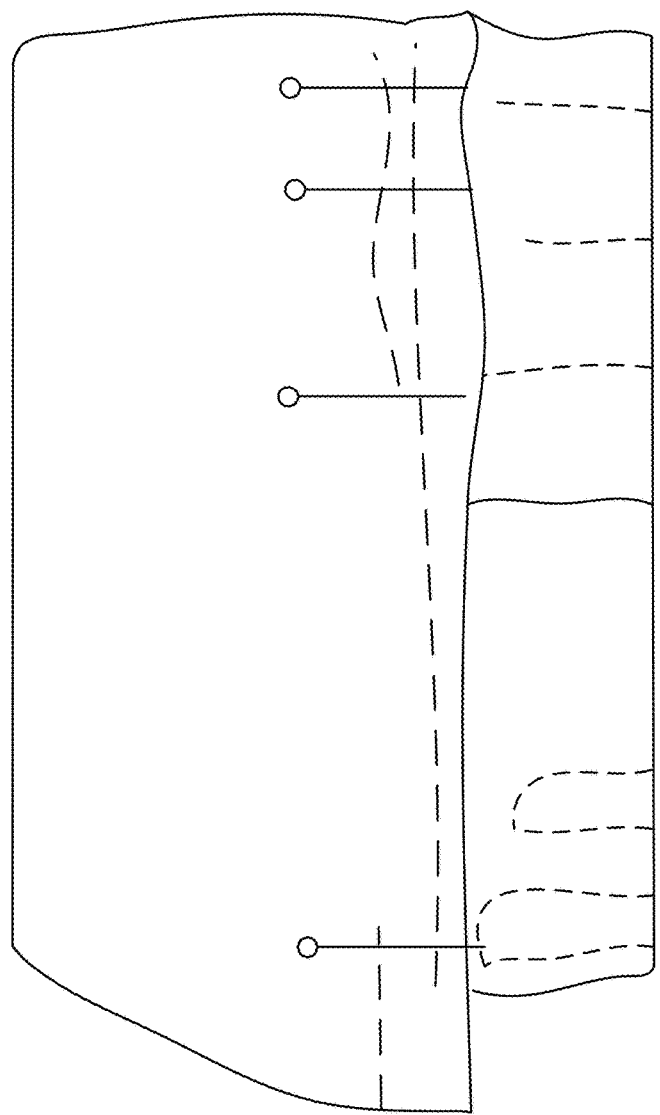
FIG. 6H illustrates the seams which internalize the vaginal and perineal seams.
Figure 6J:
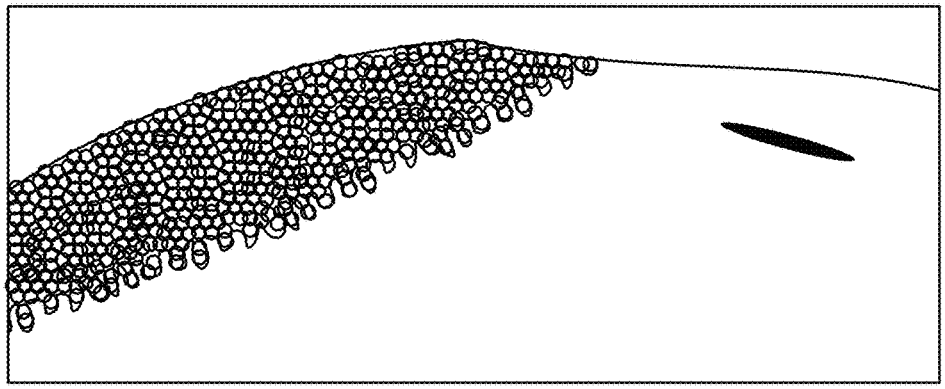
FIG. 6J illustrates an example of inner labia and hymen remnants.
Figure 6I:
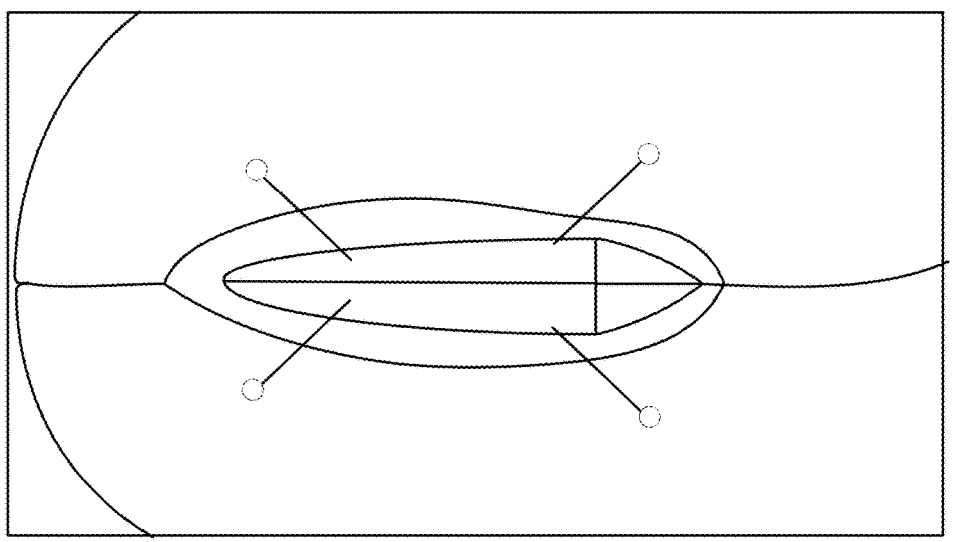
FIG. 6I illustrates an example of labial formation.
Figure 7A:
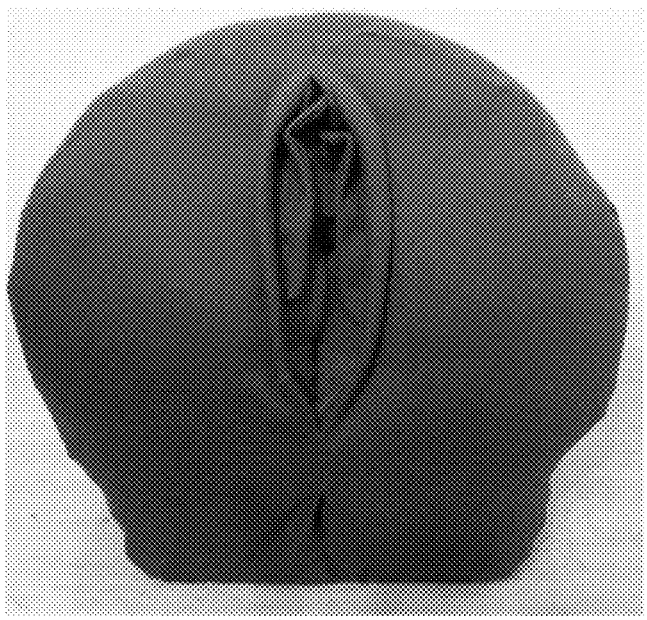
FIGS. 7A-7D show front views of examples embodiments of a female pelvic model according to the teachings herein with different labia formations.
Figure 7B:
Figure 7C:
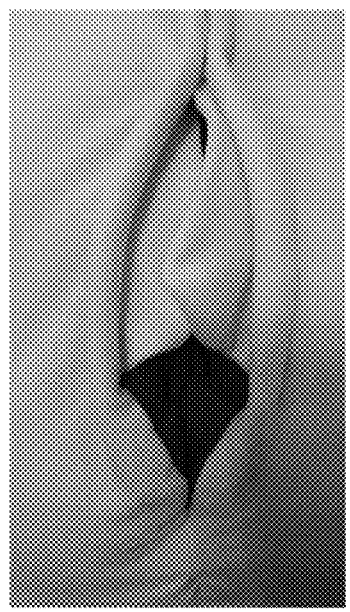
Figure 7D:
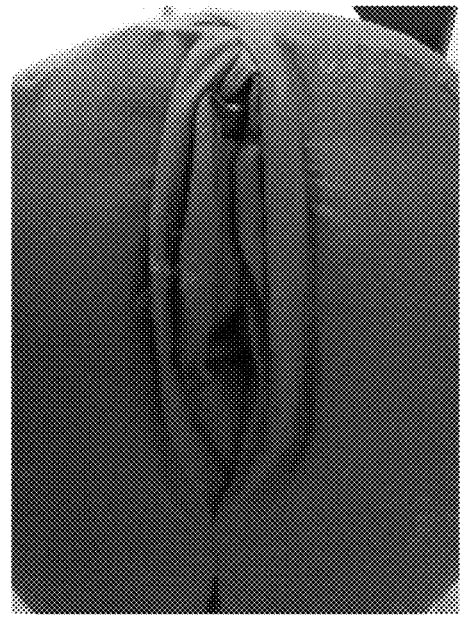

Referring now to FIGS. 6A-6J, shown therein in an example of an actual construction of a female pelvic model using fabric in accordance with one of the aspects of the teachings herein. FIG. 6A shows four internal pieces 402, 404, 406 and 408 that have been cut according to templates 302, 304, 306 and 308 respectively and may be used to form the vaginal, perineal and rectal sub-structures. FIG. 6B shows the substructure that results when sheet 402 is attached to sheet 404 to form a first substructure for the vagina, urethra and cervix, and sheet 406 is attached to sheet 408 to form a second-substructure for the rectum, the perineal body and the laceration region (the dashed lines in FIGS. 6A-6J indicate stitches or seams). In particular, FIG. 6C shows a magnified view of the cervix formation by folding and sewing while FIG. 6D shows the closed pocket formation for the perineal body between the rectum and the vagina. The two substructures are then attached to one another by using a pin 409 (see FIG. 6B) in part before the substructures can be attached to other sheets. FIG. 6E then shows a first side of the internal substructures being joined to the main body of the female pelvic model. FIG. 6F shows a second side of the internal substructures being joined to another portion of the main body of the female pelvic model. FIG. 6G shows anchoring of the upper and lower portions of the internal anatomy to a rear portion of the main body. FIG. 6H shows the seams which internalize the vaginal and perineal seams. FIG. 6I shows an example of labial formation. FIG. 6J shows an example of inner labia and hymen remnants.

The female pelvic model designs described in accordance with the teachings herein may be modified to perform various procedures. For example, at least one of the female pelvic models described herein may be modified to include a sulcus laceration, a $3^{rd}$ degree laceration, a $4^{th}$ degree laceration or a laceration due to episiotomy or may be modified to practice instrumental vaginal delivery or speculum inspection.

For example, at least one embodiment described herein provides a laceration variation model which may be an integrated model including a standard $2^{nd}$ degree midline laceration. An integrated model includes a vaginal canal, a cervix, a urethra and a rectum and allows for the development of general pelvic health examination skills and childbirth related suturing. For medio lateral positioning, the $2^{nd}$ degree laceration may be angled downwards to the left or right at 45 to 60 degrees. The depth and size of the laceration may be increased to simulate a $3^{rd}$ degree laceration, with colour differentiation to indicate deep muscle layer. Alternatively, the depth and size of laceration may be increased even more to simulate a $4^{th}$ degree laceration, with penetration of the rectal canal and minor structural adaption to facilitate simulated repair of the rectum, deep perineal muscle layer, and superficial perineal muscle layer. Alternatively, the model may be modified to provide a sulcus laceration model which includes a $2^{nd}$ degree laceration along the length of either the right or left vaginal wall, without laceration on the perineal plane (i.e. the laceration is inside the vagina only).

As another example, at least one embodiment described herein provides a pelvic teaching model, which may be the same as the integrated model, with the omission of a laceration. The portion of the canal structure behind the cervical opening may be stuffed to simulate a palpable, non-gravid (non-pregnant) uterus, which can be felt bi-manually with fingers from one hand inserted into the simulated vagina, while the fingers of the other hand can be placed atop the female pelvic model. Simulated ovaries (e.g. almond-sized, softly stuffed and closed ovals) may be suspended bilaterally in the upper body of the model and may also be palpable with bi-manual examination. The stretchiness of the vaginal canal and the presence of a simulated cervix permit speculum examination and simulated sampling from the cervix as is done during an actual PAP screening.

As another example, at least one embodiment described herein provides an episiotomy teaching model which may be the same as the integrated model but with a replaceable laceration closure that can be cut with episiotomy scissors. Once the episiotomy cut is completed, the existing simulated laceration is exposed and can be repaired in the same fashion as is done for an integrated model with a standard midline laceration or a customized laceration.

As another example, at least one embodiment described herein provides an instrumental vaginal delivery model. This model may be the same as the episiotomy and integrated models, but is larger in size to accommodate a simulated fetal head (which can be implemented using an appropriately sized doll head or ball or other simulation object). The tension of the stretchable vagina holds the fetal head in position. Application of forceps and a vacuum can stimulate live procedures such as at least one of: 1) urethral catheterization; 2) digital examination of the simulated fetal head for position inside the vagina prior to application of instruments; 3) application of operative delivery instruments with skills development working within a confined but pliable space without any false emptiness between the fetal head and vaginal walls; 4) digital examination to ensure no material (i.e. simulated maternal flesh) is trapped by the instruments; 5) simulated episiotomy if indicated; 6) controlled, simulated delivery of the fetal head, and 7) simulated laceration repair.

As another example, at least one embodiment described herein provides a perineal repair model. This model may retain the cervical, vaginal, and perineal structures of the integrated model, but may has a smaller overall body size and may omit the urethral and rectal structures. The reduced material costs and complexity of the perineal repair model reduces overall pricing and increases accessibility of purchasing. In programs with constrained budgets, instructors may wish to teach on fully integrated models and have students practice on the simplified perineal repair models.

In another embodiment, at least one of the female pelvic models described in accordance with the teachings herein provides more extensive structural and functional features including vagina, a cervix, and at least one of a vaginal-perineal laceration, a rectum and a urethra. This allows for customizable fabrication of female pelvic models with desired features which may include specification of the location and degree/extent of a laceration such as, for example, episiotomy lacerations, as well as $2^{nd}$, $3^{rd}$ and $4^{th}$ degree lacerations.

In another aspect, the customizable nature of the female pelvic models described in accordance with the teachings herein allow for the creation of a non-laceration female pelvic model for purposes of sterile and/or clean speculum examination and simulation of specimen sampling as well as for performing at least one functional operation such as urethral catheterization (e.g. for simulation of emptying bladder) or cervical catheterization (e.g. for simulation of cervical ripening prior to induction of labor) depending on the structural features of a given female pelvic model.

In another aspect, at least one of the female pelvic models described in accordance with the teachings herein provides more extensive structural and functional features including vagina, a cervix, and at least one of a vaginal-perineal laceration, a rectum and a urethra that may be flexibly anchored such that they maintain the proper location while being more structurally useful as they may move more realistically when manipulated which provides for better simulation than foam block based methods and limited anatomy models.

In another aspect, at least one of the female pelvic models described in accordance with the teachings herein that include vagina, a cervix, a vaginal-perineal laceration, and a rectum allow for more complete simulation of various procedures: including visualization, digital retraction, suturing into a 3-D space including along the vaginal plane, along the perineal plane and possibly allowing for subcuticular suturing, as well as inspection for completeness and accuracy (including a digital rectal exam to determine if there were any misplaced sutures) therefore allowing for a more complete repair process from inspection through placement of sutures in simulated muscle and tissue layers compared to other models which either are generally limited to partial skills development due to incomplete anatomical features and lack of adequate resemblance to real-life bodies and suturing technique or may offer full anatomy but tend to be made of less pliable and more expensive material, and often require assembly of component parts thereby decreasing how realistic the model is.

In another aspect, at least one of the female pelvic models described in accordance with the teachings herein provides for pliable and flexible structures including a vagina with stretchabe and relaxable walls, a pliable urethra, a pliable cervix and a pliable rectum which provides for more realistic tactile manipulation of these structures when simulating various procedures or inspections that may be performed on the female pelvic area.

In another aspect, the female pelvic models described in accordance with the teachings herein generally are made from various pieces of fabric and flexible filler material that allows for easy storage and maintenance as well as providing for a light weight, dry, soft, pliable and low-cost model in contrast to conventional female pelvic models that are made of materials more commonly used in medical modelling such as soft and hard plastics, latex, silicone and other materials. These materials also result in a lower replacement cost for the female pelvic models described herein compared to other anatomy-based models as the fabric components may be repairable or replaceable without having to replace the entire female pelvic model. Even if the whole fabric model needs to be replaced, it may be replaced at a lower cost than other models with high fidelity.

In another aspect, the fabric design of at least one of the female pelvic models described in accordance with the teachings herein may also be more durable than plasticized models in terms of being able to better tolerate punctures from needles and being more re-useable and less costly to repair.

In another aspect, at least one of the female pelvic models described in accordance with the teachings herein has a vaginal canal with a cervix that is anchored to a portion of the main body, such as the back seam, so that repeated digital exploration of the vaginal canal and the cervix, as well as repeated suturing of lacerations do not disrupt the structural integrity of the female pelvic model. In addition, the use of a separate pocket of stuffing between the vagina canal and the rectal canal may also maintain the structural integrity of the female pelvic model and facilitates repeated rectal examination to rule out sutures placed too deeply when practicing repair of lacerations. The rectal canal may also be anchored to the main body, such as at the back seam.

In another aspect, the fabric design of at least one of the female pelvic models described in accordance with the teachings herein allow for the selection of many aesthetic features including model shape and appearance, as well as possibly the use of printed fabric and/or possibly the use of various trim options such as stitches or lace and customized inclusions of various features such as inner and outer labia, hymen ring or hymen remnants, for example.

In alternative embodiments, the various female pelvic model embodiments described in accordance with the teachings herein have outer layers that are made of fabric that has different colors according to different skin tones such as, but not limited to, white, brown, black and different shades thereof, for example.

In alternative embodiments, the various female pelvic model embodiments described in accordance with the teachings herein have outer layers that are made of print fabrics according to a variety of patterns and colors.

Another aspect of the female pelvic model which can be varied in the different embodiments described herein is the overall size of the female pelvic models. For example, at least one of the various female pelvic models described herein may have an overall size that is smaller than an actual sized (i.e. "life size") adult female pelvis or has an overall size that is approximately life size or has an overall size that is larger than life size. The different overall sizes for the female pelvic models may be useful for different types of instruction and practice. For example, a female pelvic model that has an overall size that is approximately life size is particularly useful for speculum exam practice and instrumental delivery practice.

In terms of practicing or demonstrating instrumental delivery (e.g. using a vacuum or forceps), a life size female pelvic model in accordance with the teachings herein has the same basic structure as an actual female pelvic and certain material can be used for the vaginal canal providing enough tension to hold a simulated fetal head in place, and enough stretch-ability for the fetal head to be lowered down the vaginal passage and passed over the introitus by application and use of forceps for vacuum. Such female pelvic models may or may not have any lacerations and may or may not be configured to facilitate episiotomy practice, since episiotomy is sometimes combined with instrumental delivery in actual practice.

In the various embodiments described herein, separate pieces of fabric may be used to construct the internal compartments or one piece of fabric may be used with all of the internal structures formed or delineated by stitching.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments described herein, the general scope of which is defined in the appended claims.

The invention claimed is:

1. An integrated female pelvic model comprising:
   a main body having a front opening with curved edges to define a pliable vulvar opening; and
   a first compartment having:
      a front portion that is flexibly attached to the curved edges of the main body;
      an end portion that is disposed within the main body having a first side that is shaped to provide a cervix structure and a second side that is flexibly anchored to a first portion of the main body; and
      a first channel that extends within the first compartment from the front portion to the end portion of the first compartment, the first channel defining a continuous, flexible vagina ending at the cervix structure.

2. The female pelvic model of claim 1, wherein the cervix structure comprises a cervix opening and a rear enclosure forming a closed pocket that is flexibly anchored to the main body, the cervix opening being sized to allow a finger or cervical catheter to pass therethrough and to allow for inflation of a catheter inflation lumen.

3. The female pelvic model of claim 2, wherein the model comprises a second channel having a first open end disposed above the first channel, the second channel extending into the main body, being flexible and being shaped to provide a pliable urethra.

4. The female pelvic model of claim 3, wherein the second channel has a length that is about a third to a half of a length of the first channel and has a second opening at a distal end that is sized to allow a urinary catheter to visibly and palpably pass therethrough, and allow for lumen inflation of the catheter.

5. The female pelvic model of claim 3, wherein the second channel is part of the first compartment but is spaced apart from the first channel.

6. The female pelvic model of claim 1, wherein the main body comprises a second compartment being flexibly attached to a portion of the curved edges of the main body and being partially open to the first channel, the second compartment being shaped to simulate a flexible laceration.

7. The female pelvic model of claim 6, wherein the second compartment is flexibly anchored to a second portion of the main body to provide correct positioning based on a severity and angle of laceration.

8. The female pelvic model of claim 6, wherein the main body comprises a third channel with an opening disposed beneath the first compartment, the third channel extending into the main body, being flexible and being shaped to provide a pliable rectum and being flexibly anchored to a third portion of the main body to provide correct positioning of the rectum.

9. The female pelvic model of claim 8, wherein the first compartment, the first channel and the second channel are formed using two sheets of fabric that are attached together and the second compartment and the third channel are formed using another two sheets of fabric that are attached together.

10. The female pelvic model of claim 1, wherein the main body is flexible.

11. The female pelvic model of claim 1, wherein an exterior of the model is made of a fabric material comprising natural, synthetic or blended fabrics that maintain integrity of shape.

12. The female pelvic model of claim 1, wherein an exterior of the model is made of fabric comprising a cotton weave.

13. The female pelvic model of claim 1, wherein the first compartment is made of ribbed cotton providing vertical and horizontal stretching but not stretching along a longitudinal axis thereof.

14. The female pelvic model of claim 1, wherein the model comprises a flexible filler material and a re-openable closure to allow for inserting or replacing the flexible filler material inside the female pelvic model.

15. The female pelvic model of claim 14, wherein the flexible filler material comprises polyester.

16. The female pelvic model of claim 1, wherein the main body comprises a base having a non-slip outer surface.

17. The female pelvic model of claim 1, wherein the main body comprises a base and a front surface that is inclined relative to the base at an angle less than 90 degrees to simulate an actual female pelvic position encountered during various procedures comprising at least one of examination, repair of lacerations incurred during childbirth, speculum examination and PAP sample collection.

18. The female pelvic model of claim 1, wherein the main body comprises:
a front section having a front wall with the front opening;
a mid-section flexibly attached to the front section, the mid-section having arched sidewalls;
a rear section flexibly attached to the mid-section; and
a base section flexibly attached to the front section, the mid-section and the rear section.

19. The female pelvic model of claim 18, wherein the rear section provides anchor points for several flexible elements of the female pelvic model.

20. An integrated female pelvic model comprising:
a main body that is flexible;
a vaginal structure having a first open end that is disposed at a front surface of the main body and a second end that is disposed within the main body; and
a cervical structure having a first end that is disposed at the second end of the vaginal structure and a second end that is flexibly coupled to a first rear portion of the main body, the first end of the cervical structure having a front wall with a cervical opening that is smaller than the first open end of the vaginal structure to simulate digital examination or catheterization of the cervix;
wherein the main body and the structures are made of fabric.

21. The female pelvic model of claim 20, wherein the model further comprises a compartment disposed below the vaginal structure, the compartment having a first end disposed on the front surface of the main body, a second end that is flexibly anchored to a second rear portion of the main body and is shaped to form a flexible laceration.

22. An integrated female pelvic model comprising:
a main body that is flexible;
a vaginal structure having a first open end that is disposed at a front surface of the main body and a second end that is disposed within the main body;
a cervical structure having a first end that is disposed at the second end of the vaginal structure and a second end that is flexibly coupled to a first rear portion of the main body; and
at least one of:
a pliable urethra structure that is disposed at the front surface of the main body and is formed by a second channel with an opening disposed above the vaginal structure; and
a pliable rectum structure that is disposed at the front surface of the main body, includes a third channel with an opening disposed beneath the vaginal structure, and is flexibly anchored to a portion of the main body,
wherein the main body and the structures are made of fabric.

* * * * *

UNITED STATES PATENT AND TRADEMARK OFFICE
CERTIFICATE OF CORRECTION

PATENT NO.         : 10,347,156 B2
APPLICATION NO.    : 15/234713
DATED              : July 9, 2019
INVENTOR(S)        : Andrea Lea Robertson Page 1 of 1

It is certified that error appears in the above-identified patent and that said Letters Patent is hereby corrected as shown below:

In the Specification

Column 6, Line 60, "structure 3T" should read -- structure 37. --

Signed and Sealed this
Seventeenth Day of March, 2020

Andrei Iancu
*Director of the United States Patent and Trademark Office*